United States Patent
Sekiguchi et al.

(10) Patent No.: US 7,101,498 B2
(45) Date of Patent: Sep. 5, 2006

(54) THERMOPLASTIC NORBORNENE RESIN BASED OPTICAL FILM

(75) Inventors: Masayuki Sekiguchi, Chiba-ken (JP); Yasuhiro Sakakura, Ibaraki-ken (JP); Hiraku Shibata, Chiba-ken (JP)

(73) Assignee: JSR Corporation, Tokyo (JP)

( * ) Notice: Subject to any disclaimer, the term of this patent is extended or adjusted under 35 U.S.C. 154(b) by 26 days.

(21) Appl. No.: 10/491,433

(22) PCT Filed: Dec. 20, 2002

(86) PCT No.: PCT/JP02/13342

§ 371 (c)(1),
(2), (4) Date: Apr. 12, 2004

(87) PCT Pub. No.: WO03/056365

PCT Pub. Date: Jul. 10, 2003

(65) Prior Publication Data

US 2004/0242823 A1    Dec. 2, 2004

(30) Foreign Application Priority Data

Dec. 25, 2001 (JP) ............................ 2001-392157
Feb. 22, 2002 (JP) ............................ 2002-045708

(51) Int. Cl.
*G02B 5/23* (2006.01)
*G02B 5/30* (2006.01)
*G02F 1/01* (2006.01)

(52) U.S. Cl. ........................ 252/586; 252/585; 359/240; 428/1.31

(58) Field of Classification Search ................ 252/585; 359/883
See application file for complete search history.

(56) References Cited

U.S. PATENT DOCUMENTS

| | | | |
|---|---|---|---|
| 5,053,471 A | 10/1991 | Goto et al. | |
| 5,178,955 A * | 1/1993 | Aharoni et al. | 428/421 |
| 5,516,456 A | 5/1996 | Shinohara et al. | |
| 5,611,985 A * | 3/1997 | Kobayashi et al. | 264/291 |
| 6,063,886 A * | 5/2000 | Yamaguchi et al. | 526/282 |
| 6,232,413 B1 * | 5/2001 | Starzewski et al. | 526/134 |
| 6,447,868 B1 | 9/2002 | Sekiguchi et al. | |
| 6,552,145 B1 | 4/2003 | Okada et al. | |

FOREIGN PATENT DOCUMENTS

| | | | |
|---|---|---|---|
| CA | 2234494 | | 10/1998 |
| DE | WO 98/01483 | * | 1/1998 |
| EP | 827 975 | | 3/1998 |
| EP | 0827975 A2 | * | 3/1998 |
| JP | 09316179 | | 12/1997 |
| JP | 2000-219752 | * | 8/2000 |
| JP | 2001-337222 | | 12/2001 |
| JP | 2002-156525 | | 5/2002 |
| WO | WO 02/088784 | | 11/2002 |

* cited by examiner

*Primary Examiner*—Randy Gulakowski
*Assistant Examiner*—Timothy J. Kugel
(74) *Attorney, Agent, or Firm*—Oblon, Spivak, McClelland, Maier & Neustadt, P.C.

(57) ABSTRACT

An optical film is provided, which displays a positive wavelength dependency across the entire wavelength region from 400 to 800 nm, and is capable of imparting a specified retardation to transmitted light with a single sheet of film. The optical film particularly, includes a thermoplastic norbornene-based resin with a specified structure formed of a structural unit (I) which imparts a positive birefringence and a structural unit (II) which imparts a negative birefringence, and which satisfies particular conditions with respect to $\Delta N_I(\lambda)$, $\Delta N_{II}(\lambda)$, $\Delta N_I(800)$ and $\Delta N_{II}(800)$ wherein $\Delta N_I(\lambda)$ and $\Delta N_{II}(\lambda)$ represent the difference between a refractive index $Nx(\lambda)$ in an x axis direction at a wavelength $\lambda$, and a refractive index $Ny(\lambda)$ in a y axis direction, and $\Delta N_I(800)$ and $\Delta N_{II}(800)$ represent the difference in refractive indexes at a wavelength of 800 nm, and the x axis represents the stretching direction and the y axis represents the in-plane direction perpendicular to the x direction.

15 Claims, 2 Drawing Sheets

THERMOPLASTIC NORBORNENE RESIN BASED OPTICAL FILM

TECHNICAL FIELD

The present invention relates to an optical film comprising a specific thermoplastic norbornene-based resin as a primary constituent. The film displays excellent adhesion and bonding to other materials, is highly transparent, and imparts a highly uniform retardation to transmitted light, and moreover these retardation characteristics are largely unaffected by environmental temperature and humidity and display excellent stability over time, and the absolute value of the retardation increases as the wavelength of the transmitted light lengthens (hereafter this characteristic is described as a "positive wavelength dependency"). In addition, the present invention also relates to optical films with other functions such as light diffusion, transparent conductivity and reflection prevention functions.

BACKGROUND ART

Polycarbonate and polyester films and the like, which have conventionally been used as optical films, have a large photoelasticity coefficient, and consequently minor variations in stress can cause variations in the retardation imparted to transmitted light. Furthermore, acetate films such as triacetylacetate suffer from problems relating to heat resistance and deformation on water absorption.

Cyclic polyolefin-based resins have properties which include a high glass transition temperature due to the rigidity of the primary chain structure, a non-crystalline structure with a high light transmittance due to the presence of bulky groups on the primary chain structure, and a low birefringence due to the small anisotropy of the refractive index, and are consequently drawing considerable attention as transparent thermoplastic resins with superior heat resistance, transparency and optical characteristics.

Examples of this type of cyclic polyolefin-based resin are disclosed in Japanese Laid-open publication (kokai) No. 1-132625 (JP1-132625A), Japanese Laid-open publication (kokai) No. 1-132626 (JP1-132626A), Japanese Laid-open publication (kokai) No. 63-218726 (JP63-218726A), Japanese Laid-open publication (kokai) No. 2-133413 (JP2-133413A), Japanese Laid-open publication (kokai) No. 61-120816 (61-120816A), and Japanese Laid-open publication (kokai) No. 61-115912 (JP61-115912A).

In recent years, the utilization of the above properties in the application of cyclic polyolefin-based resins to optical materials such as optical disks, optical lenses and optical fibers and the like, as well as to fields such as sealing materials for optical semiconductor sealing has been the subject of much investigation.

Similarly, in the field of optical films, the above properties of cyclic polyolefin-based resins are capable of resolving the aforementioned problems associated with conventional resins, and as a result, films formed of cyclic polyolefin-based resins have been proposed as optical films for a variety of different film applications. Specific examples include the retardation plates formed of cyclic polyolefin-based resin films disclosed in Japanese Laid-open publication (kokai) No. 4-245202 (JP4-245202A), Japanese Laid-open publication (kokai) No. 4-36120 (JP4-36120A), Japanese Laid-open publication (kokai) No. 5-2108 (JP5-2108A) and Japanese Laid-open publication (kokai) No. 5-64865 (JP5-64865A). The application of cyclic polyolefin-based resin films to protective films for polarizing plates is disclosed in Japanese Laid-open publication (kokai) No. 5-212828 (JP5-212828A), Japanese Laid-open publication (kokai) No. 6-51117 (JP6-51117A) and Japanese Laid-open publication (kokai) No. 7-77608 (JP7-77608A). Moreover, a liquid crystal display element substrate formed of a cyclic polyolefin-based resin film is disclosed in Japanese Laid-open publication (kokai) No. 5-61026 (JP5-61026A).

In the applications described above, the fact that a cyclic polyolefin-based resin with a water absorption of no more than 0.05% can be produced with relative ease, and this low water absorption value are reported as the special characteristics of the resins, and are described as essential properties. However, if this type of low water absorption cyclic polyolefin-based resin film is used as a retardation plate or a liquid crystal display element substrate, then the film may suffer from inferior adhesion to a hard coat, an antireflective film or a transparent conductive layer, or inferior bonding with the polarizing plate and the glass respectively. In cases in which a cyclic polyolefin-based resin film is used as a protective film for a polarizing plate, then in addition to the adhesion problems outlined above, an additional problem arises in that the water of the aqueous adhesive typically used for bonding the film to the polarizer is very difficult to dry.

However, the cyclic polyolefin-based resin family includes a wide range of different structures, and not all cyclic polyolefin-based resins display a water absorption of 0.05% or less. In order to ensure a water absorption of no more than 0.05%, the cyclic polyolefin-based resin must have either a polyolefin structure formed from only carbon atoms and hydrogen atoms, or a structure which incorporates a proportion of halogen atoms.

Consequently, in order to resolve the aforementioned problems relating to low water absorption, optical films incorporating a thermoplastic norbornene-based resin with a polar group incorporated within the molecular structure have been disclosed in Japanese Laid-open publication (kokai) No. 7-287122 (JP7-287122A) and Japanese Laid-open publication (kokai) No. 7-287123 (JP7-287123A).

The optical films disclosed in these applications display superior optical characteristics including a high degree of transparency, a low retardation of transmitted light, and a uniform and stable application of retardation to transmitted light upon stretching and orientation, offer good levels of heat resistance and adhesion and bonding with other materials, and moreover also undergo little deformation on water absorption, and are consequently being investigated for potential application within a variety of optical film fields, as films capable of resolving the problems associated with optical films formed of conventional resins.

However, when optical films formed of conventional cyclic polyolefin-based resins are stretched and oriented, a function is obtained wherein retardation is imparted to transmitted light, although this function has a characteristic that the absolute value of the transmitted light retardation decreases as the wavelength of the transmitted light lengthens (hereafter this characteristic is described as a "negative wavelength dependency"). As a result, a retardation of, for example, ¼λ could not be imparted to transmitted light across the entire so-called visible light spectrum from 400 to 800 nm, using a single film. This property is true not only for optical films formed of conventional cyclic polyolefin-based resins, but also for optical films formed of the other resins described above.

As a result, conventionally, in order to impart a specified retardation, for example a retardation of ¼λ, to transmitted light within the visible light spectrum, a plurality of films for imparting retardation to the transmitted light (hereafter referred to as "retardation films") needed to be laminated together (for an example refer to Japanese Publication of Patent No. 3174367). However, this method has many associated problems including the fact that precise lamination and angle adjustment is required during the lamination, the fact that some defective products are produced during the lamination, and the fact that the lamination increases the thickness of the retardation film. Accordingly, an optical film capable of imparting a specified retardation, for example a retardation of ¼λ, to transmitted light across the entire visible spectrum with a single sheet of film has long been sought.

In order to resolve this problem, an optical film for which the absolute value of the transmitted light retardation increases as the wavelength of the light lengthens, in other words an optical film which displays a positive wavelength dependency, is required. A retardation film formed of a specific cellulose acetate-based resin has been proposed as an optical film with this type of positive wavelength dependency (Japanese Laid-open publication (kokai) No. 2000-137116 (JP2000-137116A)). However, because this retardation film is formed of a cellulose-based resin, it suffers from problems such as variations in characteristics on water absorption and inferior heat resistance.

DISCLOSURE OF INVENTION

An object of the present invention is to provide an optical film which displays a positive wavelength dependency across the entire wavelength spectrum from 400 to 800 nm, and is capable of imparting a specified retardation to transmitted light within the above wavelength range with a single sheet of film. In addition, another object of the present invention is to provide an optical film comprising a thermoplastic norbornene-based resin with a specific structure which displays the above characteristics.

In order to resolve the problems described above, a first aspect of the present invention provides:

an optical film comprising
a thermoplastic norbornene-based resin which is formed of a structural unit (I) which imparts a positive birefringence within a wavelength range from 400 to 800 nm and a structural unit (II) which imparts a negative birefringence within a wavelength range from 400 to 800 nm,
and which satisfies the conditions:

$\Delta N_I(\lambda)+\Delta N_{II}(\lambda)>0$, and $\Delta N_I(\lambda)-\Delta N_I(800)<\Delta N_{II}(800)-\Delta N_{II}(\lambda)$

[wherein, $\Delta N_I(\lambda)$ represents the difference between the refractive index $Nx(\lambda)$ in the x axis direction (namely, the direction of the stretch) at a wavelength λ within a range from 400 to 800 nm, and the refractive index $Ny(\lambda)$ in the y axis direction (namely, the in-plane direction perpendicular to the x direction), in other words $Nx(\lambda)-Ny(\lambda)$, for a stretched film produced by uniaxial stretching of a polymer film consisting of the structural unit (I), $\Delta N_{II}(\lambda)$ represents the difference between the refractive indexes at an aforementioned wavelength λ, in other words $Nx(\lambda)-Ny(\lambda)$, for a stretched film produced by uniaxial stretching of a polymer film consisting of the structural unit (II) under the same conditions as the stretching of the polymer film consisting of the structural unit (I), and $\Delta N_I(800)$ and $\Delta N_{II}(800)$ represent the values of the aforementioned difference in refractive index at a wavelength of 800 nm, for each of the stretched films respectively].

In addition, a second aspect of the present invention provides an optical film comprising a thermoplastic norbornene-based resin formed of a copolymer comprising a structural unit a represented by a general formula (1) shown below, and a structural unit b represented by a general formula (2) shown below:

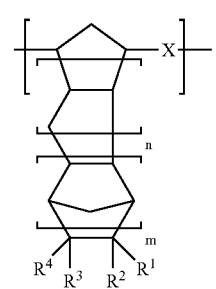

(1)

wherein, n represents either 0 or 1, and m represents either 0, or an integer of 1 or greater; X represents a group represented by a formula —CH=CH— or a group represented by a formula —CH$_2$CH$_2$—, $R^1$, $R^2$, $R^3$, and $R^4$ each represent, independently, a hydrogen atom; a halogen atom; a substituted or unsubstituted hydrocarbon group of 1 to 30 carbon atoms which may contain a linkage group incorporating an oxygen atom, a nitrogen atom, a sulfur atom or a silicon atom; or a polar group, or alternatively $R^1$ and $R^2$, or $R^3$ and $R^4$, or $R^2$ and $R^3$ may be mutually bonded together forming a hydrocarbon ring or a heterocyclic ring (wherein the hydrocarbon ring or the heterocyclic ring may be aromatic or non-aromatic, and may be either a single ring structure, or form a polycyclic structure through condensation with another ring), and at least one of the groups $R^1$ to $R^4$ is, independently, a group represented by a general formula (1-1) shown below or a group represented by a general formula (1-2) shown below; and wherein the plurality of each of the groups X, $R^1$, $R^2$, $R^3$ and $R^4$ within the copolymer may be identical or different

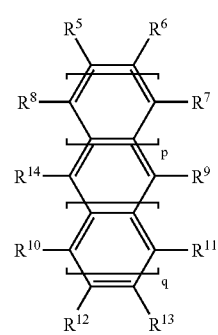

(1-1)

wherein, $R^5$ to $R^{14}$ each represent, independently, a hydrogen atom; a halogen atom; a substituted or unsubstituted monovalent hydrocarbon group of 1 to 30 carbon atoms which may contain a linkage group incorporating an oxygen atom, a nitrogen atom, a sulfur atom or a silicon atom; or a monovalent polar group, and one of the groups $R^5$ to $R^{14}$ is a group represented by a formula —C(O)O— in which the carbonyl group side is bonded to the carbon atom of the ring structure shown in the formula (1-1); p and q each represent, independently, an integer of 0 to 2, and in the case in which p=q=0, $R^6$ and $R^9$, or $R^{13}$ and $R^9$, or $R^5$ and $R^{14}$, or $R^{12}$ and $R^{14}$ may be mutually bonded together forming a hydrocarbon ring or a heterocyclic ring (wherein the hydrocarbon ring or the heterocyclic ring may be either a single ring structure, or form a polycyclic structure through condensation with another ring); and the plurality of each of the groups $R^5$ to $R^{14}$ within the copolymer may be identical or different

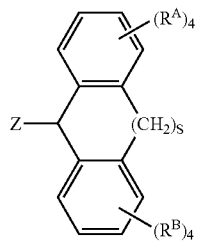

(1-2)

wherein, Z, $R^A$ and $R^B$ each represent, independently, a hydrogen atom; a halogen atom; a substituted or unsubstituted monovalent hydrocarbon group of 1 to 30 carbon atoms which may contain a linkage group incorporating an oxygen atom, a nitrogen atom, a sulfur atom or a silicon atom; or a monovalent polar group, and one of the groups $R^A$, $R^B$ and Z is a group represented by a formula —C(O)O— in which the carbonyl group side is bonded to the carbon atom of the ring structure shown in the formula (1-2); s represents 0 or an integer of 1 or greater; and the plurality of each of the groups Z, $R^A$ and $R^B$ within the copolymer may be identical or different

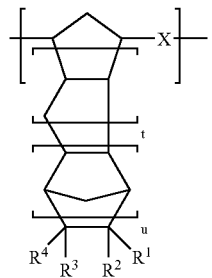

(2)

wherein, t represents 0 or 1, u represents 0 or an integer of 1 or greater; and X, $R^1$, $R^2$, $R^3$ and $R^4$ each have the same meaning as defined in relation to the aforementioned general formula (1), although those cases in which the groups $R^1$ to $R^4$ represent a group represented by the aforementioned general formula (1-1) or a group represented by the aforementioned general formula (1-2) are excluded.

In addition, the present invention also provides a production process for the optical film described immediately above comprising a step for casting an organic solvent solution comprising an aforementioned thermoplastic norbornene-based resin.

In addition, the present invention also provides an aforementioned optical film which imparts retardation to transmitted light.

In addition, the present invention also provides an aforementioned optical film with a light diffusing function on at least one surface thereof.

In addition, the present invention also provides an aforementioned optical film with a transparent conductive layer on at least one surface thereof.

In addition, the present invention also provides an aforementioned optical film with an antireflective layer on at least one surface thereof.

In addition, the present invention also provides a polarizing plate protective film formed of an aforementioned optical film.

In addition, the present invention also provides a polarizing plate comprising an aforementioned optical film.

BEST MODE FOR CARRYING OUT THE INVENTION

Figure 1:
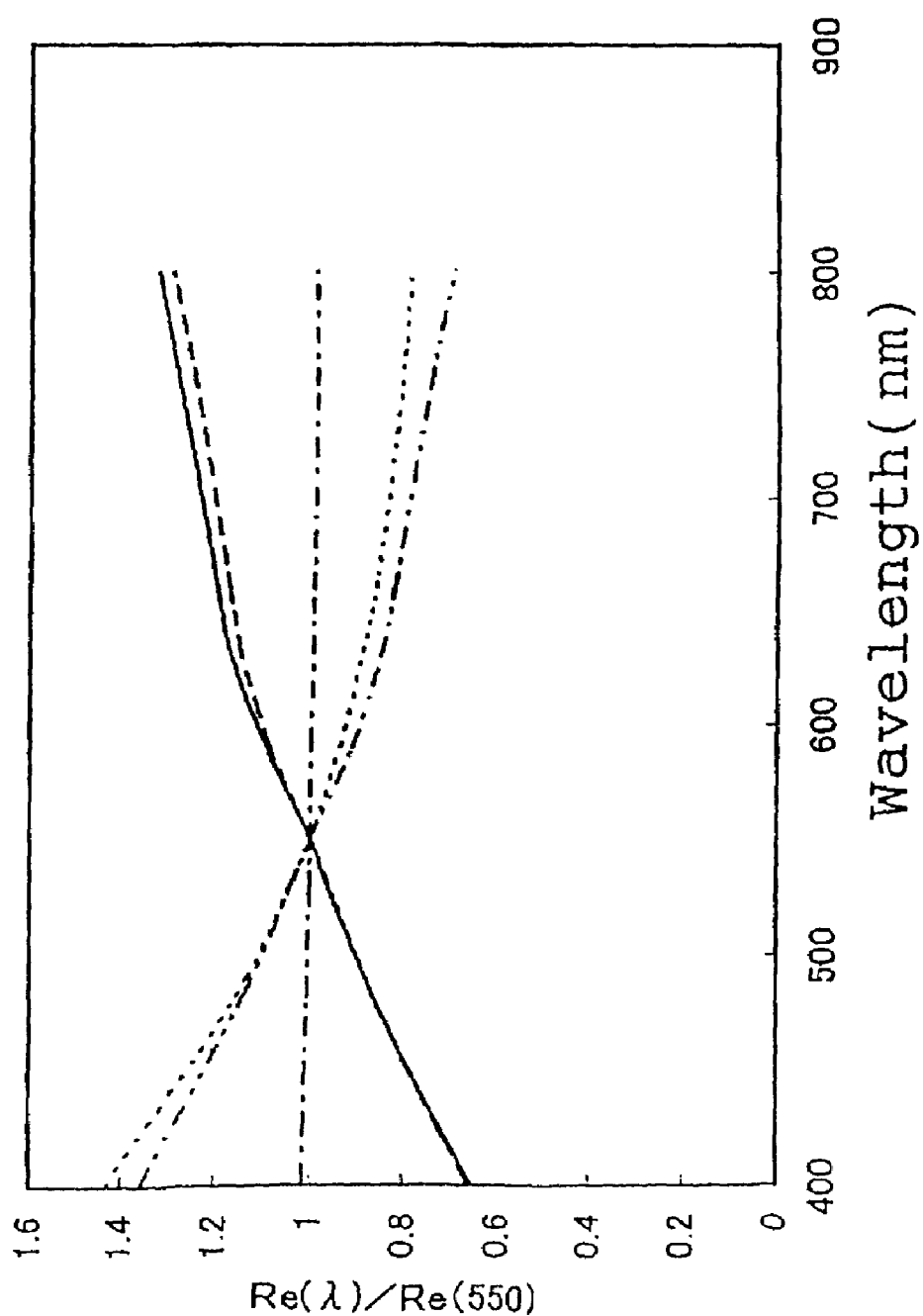
FIG. 1 is a graph showing the results of measuring a relationship Re(λ)/Re(550) of the retardation Re(λ) of transmitted light within a wavelength range from 400 to 800 nm referenced against a standard transmitted light retardation Re(550) measured at 550 nm, for retardation films (a-3) and (b-3) obtained in an example 1, and retardation films (c-3), (d-3) and (e-3) obtained in a comparative example 1.

As follows is a more detailed description of the present invention. The term "retardation" herein means the retardation of an optical phase of a light that occurs when the light is transmitted through an object. This terminology is found in a lot of literatures, for example, IDW (International Display Workshop) '00, pages 407–418.

First Aspect of the Invention

[Optical Film (1)]

First is a definition of birefringence of a high molecular compound. A positive birefringence describes the property wherein on uniaxial orientation of the molecular chain of a high molecular compound by stretching, the refractive index in the direction of the stretch is larger than the refractive index in a direction perpendicular to the stretch, whereas in contrast a negative birefringence describes the property wherein the refractive index in the direction of the stretch (the direction of uniaxial orientation) is smaller than the refractive index in a direction perpendicular to the stretch. In other words, if the stretching direction of the high molecular compound film is labeled the x axis, the in-plane direction perpendicular to the stretching direction is labeled the y axis (the direction through the thickness of the film becomes the z axis), the refractive index in the x direction is labeled Nx, the refractive index in the y direction is labeled Ny, and the difference Nx–Ny is labeled ΔN, then in those cases in which:

$\Delta N = Nx - Ny > 0$ the high molecular compound displays a positive birefringence, whereas in contrast, in those cases in which:

$$\Delta N = Nx - Ny < 0$$

the high molecular compound displays a negative birefringence.

Suitable examples of high molecular compounds which display positive birefringence include polyethylene, polypropylene and polycarbonate. In contrast, examples of high molecular compounds which display negative birefringence include polymethylmethacrylate and polystyrene.

In addition, the retardation Re is a value defined by the formula shown below:

$$Re = (Nx - Ny) \times d$$
$$= \Delta N \times d$$

(wherein d represents the optical path length), and the retardation is either a positive or a negative value depending on whether the birefringence is positive or negative respectively.

In the case of typically well known high molecular compounds, it is known that regardless of whether the birefringence is positive or negative, the absolute value of the retardation decreases as the wavelength of the transmitted light lengthens (a "negative wavelength dependency" by the above definition). Representative polymers such as polycarbonate, polyethylene terephthalate, polymethylmethacrylate and polystyrene all display this property. For example, using the retardation Re(550) of transmitted light of wavelength 550 nm as a reference, if the relationship Re($\lambda$)/Re(550) between the retardation Re(550) and the retardation Re($\lambda$) of transmitted light at an arbitrary wavelength $\lambda$ within a range from 400 to 800 nm is measured, then at all wavelength values shorter than 550 nm the value of Re($\lambda$)/Re(550) exceeds 1, and at all wavelength values longer than 550 nm, the value of Re($\lambda$)/Re(550) is less than 1.

An object of the inventors of the present invention was to provide an optical film which displayed a wavelength dependency wherein the absolute value of the retardation increased with lengthening wavelength (a positive wavelength dependency) for wavelengths within a range from 400 to 800 nm, and they conducted intensive investigations aimed at achieving this object. As a result, they discovered with considerable surprise that in a norbornene-based ring opening copolymer comprised of a structural unit imparting a positive birefringence and a structural unit imparting a negative birefringence, the copolymer birefringence approximated the sum addition of the birefringence of each of the structural units, in other words, the birefringence displayed by the copolymer correlated with the value obtained by adding the birefringence values ($\Delta N$) of each of the structural units. In addition, the inventors also discovered that if the absolute value of the birefringence of the two structural units which form the copolymer, and the birefringence wavelength dependency of the two structural units, in other words the relationship between the birefringence $\Delta N(800)$ of the two structural units for transmitted light of wavelength 800 nm and the birefringence $\Delta N(\lambda))$ of the two structural units for transmitted light of wavelength $\lambda$, can be set so as to satisfy all of the equations shown below, then the above object can be achieved, and they were consequently able to complete the present invention.

In other words, the first aspect of the present invention relates to an optical film comprising a thermoplastic norbornene-based resin which is formed from a structural unit (I) which imparts a positive birefringence for wavelengths from 400 to 800 nm and a structural unit (II) which imparts a negative birefringence for wavelengths from 400 to 800 nm, and which satisfies the conditions:

$$\Delta N_I(\lambda) + \Delta N_{II}(\lambda) > 0, \text{ and}$$

$$\Delta N_I(\lambda) - \Delta N_I(800) < \Delta N_{II}(800) - \Delta N_{II}(\lambda)$$

[wherein, $\Delta N_I(\lambda)$ represents the difference between the refractive index Nx($\lambda$) in the x axis direction (namely, the direction of the stretch) at a wavelength $\lambda$ within a range from 400 to 800 nm, and the refractive index Ny($\lambda$) in the y axis direction (namely, the in-plane direction perpendicular to the x direction), in other words Nx($\lambda$)−Ny($\lambda$), for a stretched film produced by uniaxial stretching of a polymer film consisting of the structural unit (I), $\Delta N_{II}(\lambda)$ represents the difference between the refractive indexes at an aforementioned wavelength $\lambda$, in other words Nx($\lambda$)−Ny($\lambda$), for a stretched film produced by uniaxial stretching of a polymer film consisting of the structural unit (II) under the same conditions as the stretching of the polymer film consisting of the structural unit (I), and $\Delta N_I(800)$ and $\Delta N_{II}(800)$ represent the values of the aforementioned difference in refractive index at a wavelength of 800 nm, for each of the stretched films respectively].

Herein, a structural unit which imparts a positive (or negative) birefringence is a structural unit such that a polymer consisting of the structural unit exhibits a positive (or negative) birefringence.

Examples of suitable methods for investigating whether the birefringence of the structural units are positive or negative include a method in which polymers consisting of each of the structural units are stretched uniaxially and the birefringence then measured, and CAC (Computer Aided Chemistry) including a method in which a commercial semi-empirical molecular orbit calculation program "MOPAC 97" is used to calculate the refractive index of the structural units in the direction of the principal chain and the direction of a side chain, and then compare the magnitude of these values.

Furthermore, the magnitude of the absolute value of the birefringence of the structural units can be determined using a method described below. Namely, by uniaxially stretching a polymer film consisting of a structural unit with a positive birefringence and a polymer film consisting of a structural unit with a negative birefringence under identical conditions (stretching speed: identical speed, stretching magnification: identical magnification, temperature: the glass transition temperature (Tg) of the polymer+an identical temperature), and subsequently determining the generated birefringence, the magnitude of the absolute value of the birefringence of each structural unit can be determined.

In addition, the magnitude of the wavelength dependency of the birefringence of the structural units can be determined using a method described below. Namely, by uniaxially stretching a polymer film consisting of a structural unit with a positive birefringence and a polymer film consisting of a structural unit with a negative birefringence under identical conditions (stretching speed: identical speed, stretching magnification: identical magnification, temperature: the glass transition temperature (Tg) of the polymer+an identical temperature), and subsequently measuring the generated birefringence using a plurality of different light wavelengths, the magnitude of the wavelength dependency of the birefringence of the structural units can be determined. Specifically, by measuring the birefringence at a plurality of wavelengths within a range from 400 to 800 nm (such as 450 nm, 550 nm, 650 nm and 750 nm for example), and then using a Cauchy dispersion formula or a Sellmeier dispersion formula to calculate the retardation at other light wavelengths, the magnitude of the wavelength dependency of the birefringence can be determined.

The inventors of the present invention discovered that a film comprising a thermoplastic norbornene-based resin with, for example, the specific structure described below was able to achieve the aforementioned object.

Second Aspect of the Invention

[Optical Film (2)]

<Thermoplastic Norbornene-Based Resin>

A polymer used in an optical film (2) of the present invention, namely a thermoplastic norbornene-based resin (hereafter also referred to as a "resin of the present invention") is a copolymer comprising a structural unit represented by a general formula (1) shown below, and a structural unit b represented by a general formula (2) shown below, which where necessary may also comprise other structural units.

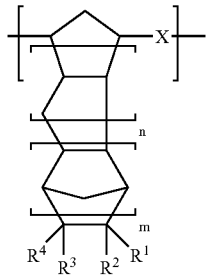
(1)

wherein, X and $R^1$ to $R^4$ are as described above, and at least one of the groups $R^1$ to $R^4$ is, independently, a group represented by a general formula (1-1) shown below or a group represented by a general formula (1-2) shown below; n represents either 0 or 1, and m represents either 0, or an integer of 1 or greater, although preferably 0 to 3, even more preferably 0 to 2, and most preferably 0.

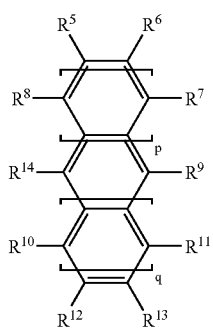
(1-1)

wherein, $R^5$ to $R^{14}$, p and q are as described above.

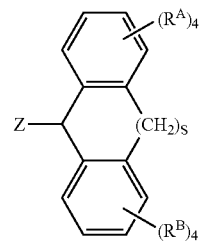
(1-2)

wherein, Z, $R^A$ and $R^B$ are as described above, and s represents either 0 or an integer of 1 or greater, although preferably 0 to 3, even more preferably 0 to 2, and most preferably 0.

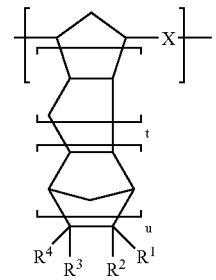
(2)

wherein, X and $R^1$ to $R^4$ are as described above, t represents either 0 or 1, and u represents either 0 or an integer of 1 or greater, although preferably 0 to 3, even more preferably 0 to 2, and most preferably 1. However, the cases in which the groups $R^1$ to $R^4$ represent a group represented by the aforementioned general formula (1-1) or a group represented by the aforementioned general formula (1-2) are excluded.

As follows is a description of the atoms and groups in the aforementioned general formula (1), the general formula (1-1), the general formula (1-2) and the general formula (2), for those cases in which $R^1$ to $R^{14}$, Z, $R^A$ and $R^B$ represent a hydrogen atom; a halogen atom; a substituted or unsubstituted hydrocarbon group of 1 to 30 carbon atoms which may contain a linkage group incorporating an oxygen atom, a nitrogen atom, a sulfur atom or a silicon atom; or a polar group.

Examples of suitable halogen atoms include fluorine atoms, chlorine atoms and bromine atoms.

Examples of suitable hydrocarbon groups of 1 to 30 carbon atoms include alkyl groups such as methyl groups, ethyl groups and propyl groups; cycloalkyl groups such as cyclopentyl groups and cyclohexyl groups; alkenyl groups such as vinyl groups, allyl groups and propenyl groups; and aromatic groups such as phenyl groups, biphenyl groups, naphthyl groups and anthracenyl groups. These hydrocarbon groups may be substituted, and suitable substituent groups include halogen atoms such as fluorine, chlorine and bromine, or phenylsulfonyl groups.

The aforementioned substituted or unsubstituted hydrocarbon groups may be either bonded directly to the cyclic structure, or bonded via a linkage group. Examples of suitable linkage groups include bivalent hydrocarbon groups of 1 to 10 carbon atoms (such as alkylene groups represented by —(CH$_2$)$_m$— (wherein m is an integer of 1 to 10)); linkage groups incorporating an oxygen atom, a nitrogen atom, a sulfur atom or a silicon atom (such as carbonyl groups (—CO—), carbonyloxy groups (—COO)—, oxycarbonyl groups (—OCO—), sulfonyl groups (—SO$_2$—), ether linkages (—O—), thioether linkages (—S—), imino groups (—NH—), amide linkages (—NHCO—, —CONH—), and siloxane linkages (—OSi(R$_2$)— (wherein R represents an alkyl group such as a methyl group or an ethyl group); and linkage groups incorporating a plurality of these linkages bonded together.

Examples of suitable polar groups include hydroxy groups, and alkoxy groups, acyloxy groups, alkoxycarbonyl groups, aryloxycarbonyl groups, cyano groups, amide groups, imide ring-containing groups, triorganosiloxy groups, triorganosilyl groups, amino groups, acyl groups, alkoxysilyl groups, sulfonyl-containing groups and carboxyl groups of 1 to 10 carbon atoms. Specific examples include alkoxy groups such as methoxy groups and ethoxy groups; acyloxy groups including alkylcarbonyloxy groups such as acetoxy groups and propionyloxy groups, as well as arylcarbonyloxy groups such as benzoyloxy groups; alkoxycarbonyl groups such as methoxycarbonyl groups and ethoxycarbonyl groups; aryloxycarbonyl groups such as phenoxycarbonyl groups, naphthyloxycarbonyl groups, fluorenyloxycarbonyl groups and biphenylyloxycarbonyl groups; triorganosiloxy groups such as trimethylsiloxy groups and triethylsiloxy groups; triorganosilyl groups such as trimethylsilyl groups and triethylsilyl groups; amino groups such as primary amino groups; and alkoxysilyl groups such as trimethoxysilyl groups and triethoxysilyl groups.

The copolymer used in an optical film of the present invention, namely the thermoplastic norbornene-based resin is a copolymer comprising a structural unit a represented by the general formula (1) and a structural unit b represented by the general formula (2) as essential structural units, and can be produced by a ring opening copolymerization of a monomer mixture comprising at least one monomer represented by a general formula (3) shown below (hereafter referred to as a "specified monomer A") and at least one monomer represented by a general formula (4) shown below (hereafter referred to as a "specified monomer B")

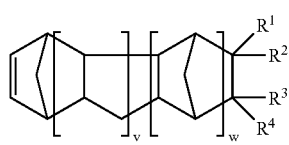
(3)

wherein, R$^1$ to R$^4$ represent the same meanings as defined in relation to the general formula (1), although at least one of the groups R$^1$ to R$^4$ is, independently, a group represented by the general formula (1-1) shown above or a group represented by the general formula (1-2) shown above, v represents either 0 or 1, and w represents either 0 or an integer of 1 or greater, although preferably 0 to 3, even more preferably 0 to 2, and most preferably 0.

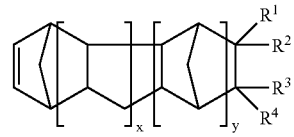
(4)

wherein, R$^1$ to R$^4$ represent the same meanings as defined in relation to the general formula (1), but excluding the cases of groups represented by the general formula (1-1) shown above and groups represented by the general formula (1-2) shown above, x represents either 0 or 1, and y represents either 0 or an integer of 1 or greater, although preferably 0 to 3, even more preferably 0 to 2, and most preferably 1.

In a resin of the present invention, the proportion of the structural unit a should be from 95 to 5% by weight, and preferably from 90 to 10% by weight, and even more preferably from 80 to 20% by weight. If the proportion of the structural unit a is less than 5% by weight, then an optical film with a positive wavelength dependency may not be obtainable. Similarly, if the proportion of the structural unit a exceeds 95% by weight then an optical film with a positive wavelength dependency may not be obtainable.

More specific examples of the thermoplastic norbornene-based resin of the present invention include the polymers (1) to (3) shown below.

(1) Ring opening copolymers of the specified monomer A and the specified monomer B.
(2) Ring opening copolymers of the specified monomer A, the specified monomer B, and another copolymerizable monomer.
(3) Hydrogenated products of the ring opening copolymers of (1) or (2) above.

<Specified Monomer A>

Specific examples of the monomer A are shown below, although the present invention is not restricted to the examples presented.
5-benzoyloxy-5-methylbicyclo[2.2.1]hept-2-ene,
5-benzoyloxybicyclo[2.2.1]hept-2-ene,
5-(1-naphthylcarbonyloxy)-5-methylbicyclo[2.2.1]hept-2-ene,
5-(1-naphthylcarbonyloxy)bicyclo[2.2.1]hept-2-ene,
5-(2-naphthylcarbonyloxy)-5-methylbicyclo[2.2.1]hept-2-ene,
5-(2-naphthylcarbonyloxy)bicyclo[2.2.1]hept-2-ene,
5-(4-biphenylcarbonyloxy)-5-methylbicyclo[2.2.1]hept-2-ene,
5-(4-biphenylcarbonyloxy)bicyclo[2.2.1]hept-2-ene,
5-(2-biphenylcarbonyloxy)-5-methylbicyclo[2.2.1]hept-2-ene,
5-(2-biphenylcarbonyloxy)bicyclo[2.2.1]hept-2-ene,
5-(3-biphenylcarbonyloxy)-5-methylbicyclo[2.2.1]hept-2-ene,
5-(3-biphenylcarbonyloxy)bicyclo[2.2.1]hept-2-ene,
5-(9-fluorenecarbonyloxy)-5-methylbicyclo[2.2.1]hept-2-ene,
5-(9-fluorenecarbonyloxy)bicyclo[2.2.1]hept-2-ene,
5-(2-fluorenecarbonyloxy)bicyclo[2.2.1]hept-2-ene,
5-(2-fluorenecarbonyloxy)-5-methylbicyclo[2.2.1]hept-2-ene,
5-(9-anthracenecarbonyloxy)-5-methylbicyclo[2.2.1]hept-2-ene,
5-(9-anthracenecarbonyloxy)bicyclo[2.2.1]hept-2-ene, 8-benzoyloxy-8-methyltetracyclo[4.4.0.1$^{2,5}$.1$^{7,10}$]-3-dodecene,
8-benzoyloxytetracyclo[4.4.0.1$^{2,5}$.1$^{7,10}$]-3-dodecene,
8-(1-naphthylcarbonyloxy)-8-methyltetracyclo [4.4.0.1$^{2,5}$.1$^{7,10}$]-3-dodecene,
8-(1-naphthylcarbonyloxy)tetracyclo[4.4.0.1$^{2,5}$.1$^{7,10}$]-3-dodecene,
8-(2-naphthylcarbonyloxy)-8-methyltetracyclo [4.4.0.1$^{2,5}$.1$^{7,10}$]-3-dodecene,
8-(2-naphthylcarbonyloxy)tetracyclo[4.4.0.1$^{2,5}$.1$^{7,10}$]-3-dodecene,
8-(4-biphenylcarbonyloxy)-8-methyltetracyclo [4.4.0.1$^{2,5}$.1$^{7,10}$]-3-dodecene,
8-(4-biphenylcarbonyloxy)tetracyclo[4.4.0.1$^{2,5}$.1$^{7,10}$]-3-dodecene,
8-(3-biphenylcarbonyloxy)-8-methyltetracyclo [4.4.0.1$^{2,5}$.1$^{7,10}$]-3-dodecene,
8-(3-biphenylcarbonyloxy)tetracyclo[4.4.0.1$^{2,5}$.1$^{7,10}$]-3-dodecene,
8-(2-biphenylcarbonyloxy)-8-methyltetracyclo [4.4.0.1$^{2,5}$.1$^{7,10}$]-3-dodecene,
8-(2-biphenylcarbonyloxy)tetracyclo[4.4.0.1$^{2,5}$.1$^{7,10}$]-3-dodecene,
8-(9-fluorenecarbonyloxy)-8-methyltetracylo[4.4.0.1$^{2,5}$.1$^{7,10}$]-3-dodecene,
8-(9-fluorenecarbonyloxy)tetracyclo[4.4.0.1$^{2,5}$.1$^{7,10}$]-3-dodecene,
8-(2-fluorenecarbonyloxy)-8-methyltetracyclo[4.4.0.1$^{2,5}$.1$^{7,10}$]-3-dodecene,
8-(2-fluorenecarbonyloxy)tetracyclo[4.4.0.1$^{2,5}$.1$^{7,10}$]-3-dodecene,
8-(9-anthracenecarbonyloxy)-8-methyltetracyclo [4.4.0.1$^{2,5}$.1$^{7,10}$]-3-dodecene, and
8-(9-anthracenecarbonyloxy)tetracyclo[4.4.0.1$^{2,5}$.1$^{7,10}$]-3-dodecene.

These monomers may be used singularly, or in combinations of two or more monomers.

<Specified Monomer B>

Specific examples of the monomer B are shown below, although the present invention is not restricted to the examples presented.

bicyclo[2.2.1]hept-2-ene,
5-methylbicyclo[2.2.1]hept-2-ene,
5-ethylbicyclo[2.2.1]hept-2-ene,
5-isopropylbicyclo[2.2.1]hept-2-ene,
5-n-butylbicyclo[2.2.1]hept-2-ene,
5-n-hexylbicyclo[2.2.1]hept-2-ene,
5-cyclohexylbicyclo[2.2.1]hept-2-ene,
5-n-octylbicyclo[2.2.1]hept-2-ene,
5-n-decylbicyclo[2.2.1]hept-2-ene,
5-(1-naphthyl)bicyclo[2.2.1]hept-2-ene,
5-(2-naphthyl)-5-methylbicyclo[2.2.1]hept-2-ene,
5-(4-biphenyl)bicyclo[2.2.1]hept-2-ene,
5-(4-biphenyl)-5-methylbicyclo[2.2.1]hept-2-ene,
5-methoxycarbonylbicyclo[2.2.1]hept-2-ene,
5-methyl-5-methoxycarbonylbicyclo[2.2.1]hept-2-ene,
5-phenoxycarbonylbicyclo[2.2.1]hept-2-ene,
5-methyl-5-phenoxycarbonylbicyclo[2.2.1]hept-2-ene,
5-cyanobicyclo[2.2.1]hept-2-ene,
5-ethylidenebicyclo[2.2.1]hept-2-ene,
5-phenylbicyclo[2.2.1]hept-2-ene,
5-fluorobicyclo[2.2.1]hept-2-ene,
5-fluoromethylbicyclo[2.2.1]hept-2-ene,
5-trifluoromethylbicyclo[2.2.1]hept-2-ene,
5-pentafluoroethylbicyclo[2.2.1]hept-2-ene,
5,5-difluorobicyclo[2.2.1]hept-2-ene,
5,6-difluorobicyclo[2.2.1]hept-2-ene,
5,5-bis(trifluoromethyl)bicyclo[2.2.1]hept-2-ene,
5,6-bis(trifluoromethyl)bicyclo[2.2.1]hept-2-ene,
5-methyl-5-trifluoromethylbicyclo[2.2.1]hept-2-ene,
5,5,6-trifluorobicyclo[2.2.1]hept-2-ene,
5,5,6-tris(trifluoromethyl)bicyclo[2.2.1]hept-2-ene,
5,5,6,6-tetrafluorobicyclo[2.2.1]hept-2-ene,
5,5,6,6-tetrakis(trifluoromethyl)bicyclo[2.2.1]hept-2-ene,
5,5-difluoro-6,6-bis(trifluoromethyl)bicyclo[2.2.1]hept-2-ene,
5,6-difluoro-5,6-bis(trifluoromethyl)bicyclo[2.2.1]hept-2-ene,
5,5,6-trifluoro-6-trifluoromethylbicyclo[2.2.1]hept-2-ene,
5-fluoro-5-pentafluoroethyl-6,6-bis(trifluoromethyl)bicyclo [2.2.1]hept-2-ene,
5,6-difluoro-5-heptafluoro-iso-propyl-6-trifluoromethylbicyclo[2.2.1]hept-2-ene,
5-chloro-5,6,6-trifluorobicyclo[2.2.1]hept-2-ene,
5,6-dichloro-5,6-bis(trifluoromethyl)bicyclo[2.2.1]hept-2-ene,
5,5,6-trifluoro-6-trifluoromethoxybicyclo[2.2.1]hept-2-ene,
5,5,6-trifluoro-6-heptafluoropropoxybicyclo[2.2.1]hept-2-ene,
5-(4-phenylphenyl)bicyclo[2.2.1]hept-2-ene,
5-aminomethylbicyclo[2.2.1]hept-2-ene,
5-trimethoxysilylbicyclo[2.2.1]hept-2-ene,
5-triethoxysilylbicyclo[2.2.1]hept-2-ene,
5-tripropoxysilylbicyclo[2.2.1]hept-2-ene,
5-tributoxysilylbicyclo[2.2.1]hept-2-ene,
5-chloromethylbicyclo[2.2.1]hept-2-ene,
tricyclo[5.2.1.0$^{2,6}$]-8-decene,
tricyclo[4.4.0.1$^{2,5}$]-3-undecene,
tetracyclo[4.4.0.1$^{2,5}$.1$^{7,10}$]-3-dodecene,
8-methoxycarbonyltetracyclo[4.4.0.1$^{2,5}$.1$^{7,10}$]-3-dodecene,
8-ethoxycarbonyltetracyclo[4.4.0.1$^{2,5}$.1$^{7,10}$]-3-dodecene,
8-n-propoxycarbonyltetracyclo[4.4.0.1$^{2,5}$.1$^{7,10}$]-3-dodecene,
8-isopropoxycarbonyltetracyclo[4.4.0.1$^{2,5}$.1$^{7,10}$]-3-dodecene,
8-n-butoxycarbonyltetracyclo[4.4.0.1$^{2,5}$.1$^{7,10}$]-3-dodecene,
8-phenoxycarbonyltetracyclo[4.4.0.1$^{2,5}$.1$^{7,10}$]-3-dodecene,
8-methyl-8-methoxycarbonyltetracyclo[4.4.0.1$^{2,5}$.1$^{7,10}$]-3-dodecene,
8-methyl-8-ethoxycarbonyltetracyclo[4.4.0.1$^{2,5}$.1$^{7,10}$]-3-dodecene,
8-methyl-8-n-propoxycarbonyltetracyclo[4.4.0.1$^{2,5}$.1$^{7,10}$]-3-dodecene,
8-methyl-8-isopropoxycarbonyltetracyclo[4.4.0.1$^{2,5}$.1$^{7,10}$]-3-dodecene,
8-methyl-8-n-butoxycarbonyltetracyclo[4.4.0.1$^{2,5}$.1$^{7,10}$]-3-dodecene,
8-methyl-8-phenoxycarbonyltetracyclo[4.4.0.1$^{2,5}$.1$^{7,10}$]-3-dodecene,
8-ethylidenetetracyclo[4.4.0.1$^{2,5}$.1$^{7,10}$]-3-dodecene,
8-phenyltetracyclo[4.4.0.1$^{2,5}$.1$^{7,10}$]-3-dodecene,
8-methyl-8-phenyltetracyclo[4.4.0.1$^{2,5}$.1$^{7,10}$]-3-dodecene,
8-fluorotetracyclo[4.4.0.1$^{2,5}$.1$^{7,10}$]-3-dodecene,
8-fluoromethyltetracyclo[4.4.0.1$^{2,5}$.1$^{7,10}$]-3-dodecene,
8-difluoromethyltetracyclo[4.4.0.1$^{2,5}$.1$^{7,10}$]-3-dodecene,
8-trifluoromethyltetracyclo[4.4.0.1$^{2,5}$.1$^{7,10}$]-3-dodecene,
8-pentafluoroethyltetracyclo[4.4.0.1$^{2,5}$.1$^{7,10}$]-3-dodecene,
8,8-difluorotetracyclo[4.4.0.1$^{2,5}$.1$^{7,10}$]-3-dodecene,
8,9-difluorotetracyclo[4.4.0.1$^{2,5}$.1$^{7,10}$]-3-dodecene,
8,8-bis(trifluoromethyl)tetracyclo[4.4.0.1$^{2,5}$.1$^{7,10}$]-3-dodecene,
8,9-bis(trifluoromethyl)tetracyclo[4.4.0.1$^{2,5}$.1$^{7,10}$]-3-dodecene, 8-methyl-8-trifluoromethyltetracyclo[4.4.0.1$^{2,5}$.1$^{7,10}$]-3-dodecene,
8,8,9-trifluorotetracyclo[4.4.0.1$^{2,5}$.1$^{7,10}$]-3-dodecene,
8,8,9-tris(trifluoromethyl)tetracyclo[4.4.0.1$^{2,5}$.1$^{7,10}$]-3-dodecene,
8,8,9,9-tetrafluorotetracyclo[4.4.0.1$^{2,5}$.1$^{7,10}$]-3-dodecene,
8,8,9,9-tetrakis(trifluoromethyl)tetracyclo[4.4.0.1$^{2,5}$.1$^{7,10}$]-3-dodecene,
8,8-difluoro-9,9-bis(trifluoromethyl)tetracyclo[4.4.0.1$^{2,5}$.1$^{7,10}$]-3-dodecene,
8,9-difluoro-8,9-bis(trifluoromethyl)tetracyclo[4.4.0.1$^{2,5}$.1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-trifluoromethyltetracyclo[4.4.0.1$^{2,5}$.1$^{7,10}$]-3-dodecene,
8,8,9-trifluoro-9-pentafluoropropoxytetracyclo[4.4.0.1$^{2,5}$.1$^{7,10}$]-3-dodecene,
8-fluoro-8-pentafluoroethyl-9,9-bis(trifluoromethyl)tetracyclo[4.4.0.1$^{2,5}$.1$^{7,10}$]-3-dodecene,
8,9-difluoro-8-heptafluoroiso-propyl-9-trifluoromethyltetracyclo[4.4.0.1$^{2,5}$.1$^{7,10}$]-3-dodecene,
8-chloro-8,9,9-trifluorotetracyclo[4.4.0.1$^{2,5}$.1$^{7,10}$]-3-dodecene,
8,9-dichloro-8,9-bis(trifluoromethyl)tetracyclo[4.4.0.1$^{2,5}$.1$^{7,10}$]-3-dodecene,
8-(2,2,2-trifluoroethoxycarbonyl)tetracyclo[4.4.0.1$^{2,5}$.1$^{7,10}$]-3-dodecene,
8-methyl-8-(2,2,2-trifluoroethoxycarbonyl)tetracyclo[4.4.0.1$^{2,5}$.1$^{7,10}$]-3-dodecene,
pentacyclo[6.5.1.1$^{3,6}$.0$^{2,7}$.0$^{9,13}$]-4-pentadecene,
pentacyclo[9.2.1.1$^{4,7}$.0$^{2,10}$.0$^{3,8}$]-5-pentadecene,
pentacyclo[10.2.1.1$^{5,8}$.0$^{2,11}$.0$^{4,9}$]-6-hexadecene,
heptacyclo[13.2.1.1$^{3,13}$.1$^{6,9}$.0$^{2,14}$.0$^{4,12}$.0$^{5,10}$]-7-icosene, and heptacyclo[8.8.0.1$^{4,7}$.1$^{11,18}$.1$^{13,16}$.0$^{3,8}$.0$^{12,17}$]-5-henicosene.

These monomers may be used singularly or in combinations of two or more monomers.

Of these monomers B, the specified monomers B of the general formula (4) in which x=0 and y=1 provide a good balance between heat resistance and toughness in the product polymer, and are consequently preferred. In other words, if a specified monomer B in which x is 2 or greater is used, then there is a tendency for the product polymer to have a high glass transition temperature (Tg), and for the heat resistance to improve, which may be preferable in some cases, but there is also a tendency for the toughness to deteriorate, meaning that there is an increased likelihood of a film produced from the polymer breaking or rupturing, either during use or during processing.

The use of specified monomers B which comprise at least one polar group within the molecule is also preferred. In other words, in the aforementioned general formula (4), monomers in which three of the groups R$^1$ to R$^4$ are either hydrogen atoms or hydrocarbon groups of 1 to 10 carbon atoms, and the remaining one group is a polar group other than a hydrocarbon group, display improved adhesion and bonding to other materials, and are consequently preferred.

In addition, specified monomers B in which the polar group is a polar group represented by a general formula (5):

—(CH$_2$)$_z$COOR$^{15}$ (5)

[wherein, z is typically an integer from 0 to 5, and preferably from 0 to 2, and even more preferably 0, and R$^{15}$ is a monovalent organic group] produce polymers for which the glass transition temperature and the water absorption can be controlled relatively easily, and are consequently preferred. Examples of the monovalent organic group represented by R$^{15}$ in the general formula (5) include alkyl groups such as methyl groups, ethyl groups and propyl groups; aryl groups such as phenyl groups, naphthyl groups, anthracenyl groups, and biphenylyl groups; and other monovalent groups with an aromatic ring or a heterocyclic ring such as a furan ring or an imide ring, including diphenylsulfone and fluorene compounds such as tetrahydrofluorene. In the general formula (5), z is typically from 0 to 5, as described above, although monomers with smaller values of z are preferred as they give rise to product polymers with higher glass transition temperatures, and specified monomers B in which z is 0 are particularly preferred from the viewpoint of ease of synthesis.

In addition, in the aforementioned general formula (4), it is desirable that an alkyl group is also bonded to the carbon atom to which the polar group represented by the general formula (5) is bonded, as such a structure produces a product polymer with a good balance between heat resistance and water absorption. This alkyl group should preferably comprise from 1 to 5 carbon atoms, and more preferably from 1 to 2 carbon atoms, and even more preferably 1 carbon atom.

From amongst the specific examples of the specified monomer B presented above, 8-methyl-8-methoxycarbonyltetracyclo[4.4.0.1$^{2,5}$.1$^{7,10}$]-3-dodecene is particularly preferred as it increases the glass transition temperature, and is able to maintain a level of water absorption which produces good adhesion and bonding to other materials, without suffering any deleterious deformation or the like upon water absorption.

There are no particular restrictions on the quantity of the polar group within the product polymer, and this amount can be determined in accordance with the desired functions of the polymer, although typically the structural units with the polar group should comprise at least 1 mol %, and preferably at least 5 mol %, and even more preferably at least 10 mol % of the total number of structural units. The situation in which all of the structural units have a polar group is also acceptable.

The quantity of the polar group can be adjusted by appropriate selection of the relative proportions of the specified monomer A and the specified monomer B (or the other copolymerizable monomers described below) in the copolymerization, and the variety of copolymerizable monomers used.

<Other Copolymerizable Monomers>

Examples of other copolymerizable monomers which can be copolymerized with the specified monomer A and the specified monomer B include cycloolefins such as cyclobutene, cyclopentene, cycloheptene, cyclooctene, tricyclo[5.2.1.0$^{2,6}$]-3-decene and dicyclopentadiene. The number of carbon atoms within these cycloolefins should preferably be from 4 to 20 atoms, with numbers from 5 to 12 atoms being even more desirable.

The specified monomer A and the specified monomer B (and another copolymerizable monomer) may also be polymerized in the presence of an unsaturated hydrocarbon based polymer with an olefin based unsaturated bond within the primary chain such as polybutadiene, polyisoprene, styrene-butadiene copolymers, ethylene-disconjugated diene copolymers and polynorbornene. The product copolymers produced in such cases are useful as raw materials for high impact resistant resins.

<Polymerization Conditions>

As follows is a description of the conditions for the ring opening polymerization reaction between at least one specified monomer A, the specified monomer B, and in some cases another copolymerizable monomer.

Catalyst:

The ring opening copolymerization reaction is conducted in the presence of a metathesis catalyst.

This metathesis catalyst is a combination of (a) at least one compound selected from a group consisting of W, Mo and Re compounds, and (b) at least one compound selected from compounds of either a group IA element (such as Li, Na or K), a group IIA element (such as Mg or Ca), a group IIB element (such as Zn, Cd or Hg), a group IIIB element (such as B or Al), a group IVA element (such as Ti or Zr) or a group IVB element (such as Si, Sn or Pb) of the Deming periodic table, which contain at least one bond between the aforementioned element and carbon, or between the aforementioned element and hydrogen. In order to raise the activity of the catalyst, an additive (c) described below may also be added.

Representative examples of the W, Mo or Re compound of the aforementioned constituent (a) include those compounds disclosed in Japanese Laid-open publication (kokai) No. 1-240517 (JP1-240517A) such as $WCl_6$, $MoCl_5$ and $ReOCl_3$.

Specific examples of the aforementioned constituent (b) include those compounds disclosed in Japanese Laid-open publication (kokai) No. 1-240517 (JP1-240517A) such as n-$C_4H_9Li$, $(C_2H_5)_3Al$, $(C_2H_5)_2AlCl$, $(C_2H_5)_{1.5}AlCl_{1.5}$, $(C_2H_5)AlCl_2$, methyl alumoxane and LiH.

Representative examples of the constituent (c) include alcohols, aldehydes, ketones and amines, as well as those compounds disclosed in Japanese Laid-open publication (kokai) No. 1-240517 (JP1-240517A).

The amount of the metathesis catalyst used should typically result in a molar ratio between the aforementioned constituent (a) and the specified monomers A and B (hereafter the combination of the specified monomers A and B is referred to as simply the "specified monomers"), namely the ratio of constituent (a):specified monomers, which falls within a range from 1:500 to 1:50,000, and preferably within a range from 1:1000 to 1:10,000.

The relative proportions of the constituent (a) and the constituent (b) should produce a metal atom ratio (a):(b) within a range from 1:1 to 1:50, and preferably from 1:2 to 1:30.

The relative proportions of the constituent (a) and the constituent (c) should produce a molar ratio (c):(a) within a range from 0.005:1 to 15:1, and preferably from 0.05:1 to 7:1.

Molecular Weight Regulating Agent

Regulation of the molecular weight of the polymer can also be achieved through controlling the polymerization temperature, the type of catalyst and the type of solvent, although in the present invention the molecular weight should preferably be regulated by adding a molecular weight regulating agent to the reaction system.

Examples of suitable molecular weight regulating agents include α-olefins such as ethylene, propene, 1-butene, 1-pentene, 1-hexene, 1-heptene, 1-octene, 1-nonene and 1-decene, as well as styrene, and of these, 1-butene and 1-hexene are preferred.

This molecular weight regulating agent may utilize a single compound, or a combination of two or more different regulating agents.

The amount of the molecular weight regulating agent used should be from 0.005 to 0.6 mols per 1 mol of the specified monomers supplied to the polymerization reaction, with quantities from 0.02 to 0.5 mols being preferred.

Ring Opening Polymerization Reaction Solvent

Examples of suitable solvents for use in the polymerization reaction include alkanes such as pentane, hexane, heptane, octane, nonane and decane; cycloalkanes such as cyclohexane, cycloheptane, cyclooctane, decalin and norbornane; aromatic hydrocarbons such as benzene, toluene, xylene, ethylbenzene and cumene; halogenated hydrocarbon compounds such as chlorobutane, bromohexane, methylene chloride, dichloroethane, hexamethylene dibromide, chlorobenzene, chloroform and tetrachloroethylene; saturated carboxylic acid esters such as ethyl acetate, n-butyl acetate, iso-butyl acetate and methyl propionate; and ethers such as dibutyl ether, tetrahydrofuran and dimethoxyethane, and these solvents may be used singularly, or in combinations of two or more solvents. Of the above solvents, the aforementioned aromatic hydrocarbons are preferred.

The amount of solvent used should typically result in a solvent:specified monomers ratio (weight ratio) from 1:1 to 10:1, with ratios from 1:1 to 5:1 being preferred.

Hydrogenation of the Polymer

A polymer produced in the manner described above may be used, as is, as a resin of the present invention, although any residual olefin based unsaturated bonds should preferably be hydrogenated prior to use.

The hydrogenation reaction can be performed by normal methods, namely, addition of a hydrogenation catalyst to the polymer solution, and subsequent reaction with hydrogen gas at a pressure of 1 atmosphere to 300 atmospheres, and preferably 3 to 200 atmospheres, and at a temperature of 0 to 200° C., and preferably 20 to 180° C.

Examples of the hydrogenation catalyst include those catalysts typically used in hydrogenation reactions of olefin based compounds. These hydrogenation catalysts include both heterogeneous catalysts and homogeneous catalysts.

Examples of suitable heterogeneous catalysts include solid catalysts comprising a noble metal such as palladium, platinum, nickel, rhodium or ruthenium supported on a carrier such as carbon, silica, alumina or titania. Examples of suitable homogeneous catalysts include nickel naphthenate/triethyl aluminum, nickel acetylacetonate/triethyl aluminum, cobalt octenate/n-butyl lithium, titanocene dichloride/diethyl aluminum monochloride, rhodium acetate, chlorotris(triphenylphosphine)rhodium, dichlorotris(triphenylphosphine)ruthenium, chlorohydrocarbonyltris(triphenylphosphine)ruthenium, and dichlorocarbonyltris(triphenylphosphine)ruthenium. The catalysts may be in a powdered form or a granulated form.

These hydrogenation catalysts are used in quantities which produce a polymer:hydrogenation catalyst ratio (weight ratio) within a range from $1:1 \times 10^{-6}$ to 1:2.

A hydrogenated polymer produced by the hydrogenation reaction displays excellent thermal stability, and the characteristics of the polymer are unlikely to deteriorate on heating during a film production process, during stretching processing, or during use as a finished product. The hydrogenation ratio of the olefin based unsaturated bonds is typically greater than 50%, preferably at least 70%, even more preferably at least 90%, and most preferably at least 98%.

The aromatic ring within the structural unit a derived from the specified monomer A must not undergo any significant hydrogenation within the course of the above hydrogenation reaction. This type of hydrogenation reaction can be achieved by conducting the reaction under the aforementioned typical hydrogenation reaction conditions for an olefin based compound, although on occasion, adjustments may be required to the reaction conditions such as setting the hydrogen gas pressure and the reaction temperature to values at the low end of their aforementioned respective ranges, carefully selecting the hydrogenation catalyst, or adjusting the amount of the hydrogenation catalyst added.

In those cases in which another copolymerizable monomer contains a substituent which incorporates an aromatic ring, and the structural unit derived from this monomer also contains the aromatic ring, it is desirable that the reaction conditions are selected so that the unsaturated bonds of the aromatic ring undergo no significant hydrogenation.

<Characteristics of the Thermoplastic Norbornene-based Resin>

The intrinsic viscosity ($\eta_{inh}$) of a resin of the present invention measured in chloroform at 30° C. should preferably be from 0.2 to 5 dl/g. Values from 0.3 to 4 dl/g are even more preferred, and values from 0.5 to 3 dl/g are the most desirable. At intrinsic viscosity values exceeding 5 dl/g, the viscosity of the solution becomes overly large, and the workability deteriorates, whereas at values less than 0.2 dl/g, the film strength deteriorates.

The molecular weight of a resin of the present invention, measured as a polystyrene equivalent number average molecular weight (Mn) using gel permeation chromatography (GPC) is typically from 8000 to 1,000,000, and preferably from 10,000 to 500,000, and even more preferably from 20,000 to 100,000, and most preferably from 30,000 to 100,000. The weight average molecular weight (Mw) is typically within a range from 20,000 to 3,000,000, and preferably from 30,000 to 1,000,000, and even more preferably from 40,000 to 500,000, and most desirably from 40,000 to 300,000. If the Mw and Mn values exceed the above ranges, then the viscosity of the solution becomes overly large and the workability deteriorates, whereas at values smaller than the above ranges, the film strength deteriorates.

The molecular weight distribution should typically produce a Mw/Mn ratio of 1.5 to 10, with ratios from 2 to 8 being preferred, ratios from 2.5 to 5 being even more preferred, and ratios from 2.5 to 4.5 being the most desirable. If the Mw/Mn ratio exceeds the above range, then the low molecular weight component becomes too large, and when a film is produced, this low molecular weight component may bleed out at the film surface causing the film to become sticky. In contrast, if the Mw/Mn ratio is smaller than the above range, then the film strength, and particularly the film toughness deteriorates.

The glass transition temperature (Tg) of a resin of the present invention is typically from 80 to 350° C., and preferably from 100 to 250° C. In the case of a Tg value of less than 80° C., the temperature at which thermal deformation occurs falls, and there is a danger of heat resistance problems arising in the product film. In contrast, if the Tg value exceeds 350° C., then the processing temperature required when the product film is heated and subjected to stretching processing and the like becomes overly high, and there is an increased chance of the resin undergoing thermal degradation.

The saturated water absorption at 23° C. of a resin of the present invention is typically from 0.05 to 1% by weight, and preferably from 0.1 to 0.7% by weight, and even more preferably from 0.1 to 0.5% by weight. Provided the saturated water absorption falls within the above range, the various optical characteristics such as the transparency, the retardation and the uniformity of that retardation, and the precision of the dimensions can be maintained even under conditions of high temperature and humidity, and because the resin offers excellent adhesion and bonding to other materials, separation and peeling during use does not occur. Furthermore, because the resin also displays good compatibility with additives such as antioxidants, a greater degree of freedom is achievable relative to additives.

If the saturated water absorption is less than 0.05% by weight, then the adhesion and bonding to other materials deteriorates, and separation and peeling during use becomes more likely. Furthermore, there are also restrictions on the inclusion of additives such as antioxidants. In contrast, if the saturated water absorption exceeds 1% by weight, then absorption of water is more Likely to produce variations in optical characteristics and variations in dimensions.

The aforementioned saturated water absorption values are measured in accordance with ASTM D570, and are determined by immersing the sample for 1 week in 23° C. water, and measuring the increase in weight.

The SP value (solubility parameter) of a resin of the present invention should preferably be from 10 to 30 ($MPa^{1/2}$), with values from 12 to 25 ($MPa^{1/2}$) being even more preferable, and values from 15 to 20 ($MPa^{1/2}$) being the most preferred. By ensuring the SP value falls within the above range, not only can the resin be readily dissolved in normal, general purpose solvents, but a stable film production can also be achieved, the characteristics of the product film become more uniform, a product with good adhesion and bonding to substrates can be ensured, and the water absorption can also be controlled at a suitable level.

<Additives>

In a resin of the present invention, other known thermoplastic resins, thermoplastic elastomers, rubber polymers, fine organic particles or fine inorganic particles may also be added, provided they do not lower the transparency or the heat resistance of the product resin.

Other additives such as antioxidants may also be added to thermoplastic norbornene-based resins of the present invention, and examples of suitable additives such as antioxidants include the compounds listed below.

Antioxidants:

2,6-di-t-butyl-4-methylphenol, 2,2'-dioxy-3,3'-di-t-butyl-5,5'-dimethyldiphenylmethane, tetrakis[methylene-3-(3,5-di-t-butyl-4-hydroxyphenyl)propionate]methane, 1,1,3-tris(2-methyl-4-hydroxy-5-t-butylphenyl)butane, 1,3,5-trimethyl-2,4,6-tris(3,5-di-t-butyl-4-hydroxybenzyl) benzene, stearyl-β-(3,5-di-t-butyl-4-hydroxyphenyl) propionate, 2,2'-dioxy-3,3'-di-t-butyl-5,5'-diethylphenylmethane, 2,4,8,10-tetraoxaspiro[5.5] undecane, tris(2,4-di-t-butylphenyl)phosphite, cyclic neopentane tetraylbis(2,4-di-t-butylphenyl)phosphite, cyclic neopentane tetraylbis(2,6-di-t-butyl-4-methylphenyl)phosphite, and 2,2-methylenebis(4,6-di-t-butylphenyl)octylphosphite Ultraviolet Absorbing Agents:

2,4-dihydroxybenzophenone and 2-hydroxy4-methoxybenzophenone

The amount of these antioxidants and the like added should typically be within a range from 0.01 to 3 parts by weight, and preferably from 0.05 to 2 parts by weight, per 100 parts by weight of the thermoplastic norbornene-based resin.

Additives such as lubricants may also be added to improve the workability of the resin.

<Optical Films>

An optical film of the present invention can be produced by forming a resin of the present invention into a film or a sheet using a method such as a molten molding method or a solution stretching method (a solvent casting method). Of these methods, solvent casting methods are preferred due to the superior uniformity of the film thickness and the smoothness of the product surface.

An example of a solvent casting method involves dissolving or dispersing a resin of the present invention in a solvent to produce a liquid of a suitable concentration, pouring or applying this liquid on to a suitable carrier, drying the liquid, and then peeling the product away from the carrier.

When a resin of the present invention is dissolved or dispersed within a solvent, the concentration of the resin is typically set to a value from 0.1 to 90% by weight, and preferably 1 to 50% by weight, and even more preferably from 10 to 35% by weight. If the concentration of the resin is less than the above range, then various problems arise such as difficulty in ensuring an adequate film thickness, and difficulty in achieving the desired film surface smoothness due to foaming occurring during the solvent evaporation. In contrast, if the concentration exceeds the above range, then the solution viscosity becomes overly high, and it becomes difficult to produce an optical film with uniform thickness and a uniform surface.

The viscosity of the aforementioned solution at room temperature should typically be within a range from 1 to 1,000,000 (mPa·s), and preferably from 10 to 100,000 (mPa·s), and even more preferably from 100 to 50,000 (mPa·s), with viscosity values from 1000 to 40,000 (mPa·s) being the most desirable.

Examples of suitable solvents include aromatic solvents such as benzene, toluene and xylene, cellosolve based solvents such as methyl cellosolve, ethyl cellosolve and 1-methoxy-2-propanol, ketone based solvents such as diacetone alcohol, acetone, cyclohexanone, methyl ethyl ketone, 4-methyl-2-pentanone, and ethylcyclohexanone, olefin based solvents such as 1,2-dimethylcyclohexene and 1,2-diethylcyclohexene, ester based solvents such as methyl lactate and ethyl lactate, halogen-containing solvents such as 2,2,3,3-tetrafluoro-1-propanol, methylene chloride and chloroform, ether based solvents such as tetrahydrofuran and dioxane, and alcohol based solvents such as 1-pentanol and 1-butanol.

Solvents other than those listed above may also be used, and provided a solvent is used with a SP value (solubility parameter) which is typically within a range from 10 to 30 ($MPa^{1/2}$), and preferably from 10 to 25 ($MPa^{1/2}$), and even more preferably from 15 to 25 ($MPa^{1/2}$), and most preferably from 15 to 20 ($MPa^{1/2}$), then an optical film with superior surface uniformity and optical characteristics can be produced.

The above solvent may utilize either a single solvent, or a combination of two or more different solvents. In those cases in which two or more different solvents are combined, the SP value of the combined solvent should preferably fall within the SP value ranges specified above. The SP value of a mixed solvent can be determined from the relative weight ratios of each of the component solvents, and for example in the case of a two solvent mixture in which the weight proportions of the two solvents are labeled W1 and W2, and the corresponding solvent SP values are labeled SP1 and SP2 respectively, then the SP value of the mixed solvent can be determined from the formula shown below.

$$SP \text{ value} = W1 \cdot SP1 + W2 \cdot SP2$$

In those cases in which an aforementioned mixed solvent system is used, then by combining a good solvent and a poor solvent of the resin of the present invention, an optical film with a light diffusing function can be obtained. Specifically, if the SP values of the resin, the good solvent and the poor solvent are labeled (SP: resin), (SP: good solvent) and (SP: poor solvent) respectively, then by ensuring that the difference between the (SP: resin) value and the (SP: good solvent) is no more than 7, and preferably no more than 5, and even more preferably no more than 3, that the difference between the (SP: resin) value and the (SP: poor solvent) is at least 7, and preferably at least 8, and even more preferably 9 or greater, and that the difference between the (SP: good solvent) value and the (SP: poor solvent) value is at least 3, and preferably at least 5, and even more preferably 7 or greater, then a light diffusing function can be imparted to the produced optical film.

The proportion of the poor solvent within the solvent mixture should be no more than 50% by weight, and preferably no more than 30% by weight, and even more preferably no more than 15% by weight, and most preferably no more than 10% by weight. The difference in the boiling points of the poor solvent and the good solvent should be at least 1° C., and preferably at least 5° C., and even more preferably at least 10° C., and most preferably at least 20° C., and a poor solvent boiling point which is higher than the good solvent boiling point is preferred.

The temperature at which the thermoplastic norbornene-based resin is dissolved in the solvent may be either room temperature or a higher temperature. By stirring the mixture adequately, a more uniform solution can be achieved. Moreover, in those cases where coloring is required, a suitable quantity of a coloring agent such as a dye or a pigment may be added to the solution.

A leveling agent may also be added to improve the surface smoothness of the optical film. Any of the typical leveling agents may be used, and specific examples include fluorine based nonionic surfactants, special acrylic resin based leveling agents, and silicone based leveling agents.

A typical example of a method of producing an optical film of the present invention by a solvent casting method involves using a die or a coater to apply the aforementioned solution to a substrate such as a metal drum, a steel belt, a polyester film such as polyethylene terephthalate (PET) or polyethylene naphthalate (PEN), or a polytetrafluoroethylene belt, subsequently removing the solvent by drying, and then peeling the film away from the substrate. The optical film can also be produced by applying the resin solution to the substrate using spraying, brushing, roll spin coating or dipping techniques, subsequently removing the solvent by drying, and then peeling the film away from the substrate. The thickness and the surface smoothness of the optical film can also be controlled by repeating the application process.

In those cases in which a polyester film is used as the substrate, a surface treated film may be used. Examples of surface treatment methods include the common hydrophilic treatment methods in which, for example, either an acrylic-based resin or a sulfonate group-containing resin is coated or laminated onto the film, or the hydrophilicity of the film surface is increased through corona discharge treatment.

If the substrate to which the aforementioned solution is applied utilizes a metal drum, a steel belt or a polyester film or the like which has undergone surface treatment such as sand mat treatment or embossing, then the undulations caused by this surface treatment are transferred to the film surface, enabling the production of an optical film with a light diffusing function.

In cases in which a light diffusing function is imparted to the optical film in this manner, then in terms of maintaining a stable light transmittance for low wavelength light through to high wavelength light, it is preferable that the aforementioned undulations are formed of uniform size. There are no particular restrictions on the form of the undulations, which will vary considerably depending on the technique used for forming the undulations, although typical surface roughness values (center line average height: Ra) are from 0.001 to 100 µm, and preferably from 0.005 to 10 µm, and even more preferably from 0.01 to 1 µm, and most preferably from 0.05 to 1 µm. If the Ra value is less than 0.001 µm or greater than 100 µm, then a good light diffusing function is difficult to achieve. However, in cases in which a lens function such as a Fresnel lens function is imparted to the optical film, the Ra value may sometimes exceed 100 µm.

An optical film with a light diffusing function of the present invention can also be produced by casting a uniform mixture produced by adding, to a solution of a resin of the present invention, another resin or a filler which is incompatible with the resin of the present invention.

Specifically, in those cases in which an aforementioned incompatible resin is added, an incompatible resin should be selected so that the difference between the indexes of refraction of the incompatible resin and the resin of the present invention is typically at least 0.00001, and preferably at least 0.0001, and even more preferably at least 0.001, and most preferably at least 0.01.

By ensuring that, in a film produced by adding this type of incompatible resin to the solvent, and subsequently mixing, casting and drying, the number average particle diameter of the aforementioned incompatible resin is typically within a range from 0.01 to 1000 µm, and preferably from 0.05 to 500 µm, and even more preferably from 0.1 to 100 µm, and most preferably from 0.5 to 50 µm, a light diffusing effect can be produced for light from low wavelengths through to high wavelengths.

If the aforementioned difference in the indexes of refraction is less than 0.00001 or the aforementioned particle diameter is less than 0.01 µm, then imparting a satisfactory light diffusing function becomes difficult, whereas if the aforementioned particle diameter exceeds 1000 µm, then the transmittance of light falls markedly, and the precision of the film thickness and the surface are likely to deteriorate.

The amount of the above incompatible resin added can be varied in accordance with the light diffusion performance required, although typical quantities are from 0.001 to 100 parts by weight, and preferably 0.01 to 70 parts by weight, and even more preferably from 0.1 to 50 parts by weight, and most preferably from 1 to 25 parts by weight, per 100 parts by weight of the resin of the present invention. If the added quantity is less than 0.001 parts by weight, then achieving a satisfactory light diffusing function becomes difficult. In contrast, if the added quantity exceeds 100 parts by weight, then the light transmittance falls to an unfavorably low level.

Examples of suitable fillers which may be used include commercially available inorganic fillers, or organic fillers produced by finely crushing a cured thermosetting resin. The particle diameter of the filler and the amount of the filler added are similar to the case of the aforementioned incompatible resin.

Specific examples of the incompatible resin for a resin of the present invention include polymethylmethacrylate (PMMA), polystyrene, polyvinylbenzene, polyamide or polyimide. Specific examples of the aforementioned filler include metals such as gold or silver, metal oxides such as $SiO_2$, $TiO_2$, $ZnO_2$ and $Al_2O_3$, and particles of glass and quartz.

There are no particular restrictions on the drying (solvent removal) step in the aforementioned solvent casting method, and most common methods can be used, including passing the material through a drying oven using a plurality of rollers, although if foaming accompanies the evaporation of the solvent during the drying process, then the characteristics of the film deteriorate markedly, and so in order to prevent such foaming, it is preferable that the drying process is divided into a plurality of at least two steps, with the temperature or the air quantity controlled at each step.

The residual solvent content within an optical film should typically be no more than 10% by weight, and preferably no more than 5% by weight, and even more preferably no more than 1% by weight, and most preferably no more than 0.5% by weight. If the residual solvent content exceeds 10% by weight, then during actual use of the optical film, the variations in dimensions of the optical film over time will be undesirably large. The presence of residual solvent also causes a reduction in Tg, and a reduction in heat resistance, both of which are undesirable.

In order to ensure that the stretching step described below is performed satisfactorily, there are cases where the amount of the residual solvent must be adjusted within the aforementioned range. Specifically, in order to ensure a stable and uniform retardation during stretching and orientation, the residual solvent content should typically be from 10 to 0.1% by weight, and preferably from 5 to 0.1% by weight, and even more preferably from 1 to 0.1% by weight. By limiting the residual solvent content, either the stretching process becomes easier, or control of the retardation becomes simpler.

The thickness of an optical film of the present invention is typically from 0.1 to 3000 µm, and preferably from 0.1 to 1000 µm, and even more preferably from 1 to 500 µm, and most preferably from 5 to 300 µm. At a thickness of less than 0.1 µm, actual handling of the film becomes difficult. In contrast, at a thickness exceeding 3000 µm, winding the film into a roll becomes difficult.

The thickness distribution of an optical film of the present invention is typically within ±20% of the average thickness value, and preferably within ±10%, and even more preferably within ±5%, and most preferably within ±3%. The variation in thickness of the film across 1 cm is typically no more than 10%, and preferably no more than 5%, and even more preferably no more than 1%, and most preferably no more than 0.5%. By controlling the thickness in this manner, irregularity in the retardation on stretching and orientation can be prevented.

Third Aspect of the Invention

<Optical Films for Imparting Retardation to Transmitted Light>

An optical film for imparting retardation to transmitted light according to the present invention (hereafter referred to as a retardation film) is obtained by performing a stretching process on an optical film produced using a method described above. Specifically, the retardation film can be produced using known uniaxial stretching methods or biaxial stretching methods. In other words, suitable methods include transverse uniaxial stretching techniques using a tenter method, roll compression stretching techniques and longitudinal uniaxial stretching techniques using one set of two rollers with different circumferential speed, as well as biaxial stretching techniques combining a transverse axial stretch and a longitudinal axial stretch, and stretching techniques using inflation methods.

In the case of a uniaxial stretching method, the stretching speed should typically be from 1 to 5000%/min, and preferably from 50 to 1000%/min, and even more preferably from 100 to 1000%/min.

A biaxial stretching method may utilize the case in which stretching occurs simultaneously in two directions, or the case in which stretching is first performed in one direction, and then subsequently performed in a second direction different from the first. In such cases, there are no particular restrictions on the angle of intersection between the two stretching axes for controlling the shape of the index ellipsoid of the film following stretching, and this angle is determined by the specific product characteristics desired, although typically the angle is within a range from 120 to 60°. The stretching speed may be the same in both directions, or may be different in each direction, although typically the stretching speed in both directions should be from 1 to 5000%/min, and preferably from 50 to 1000%/min, and even more preferably from 100 to 1000%/min, and most preferably from 100 to 500%/min.

There are no particular restrictions on the stretching process temperature, although referenced against the glass transition temperature Tg of the thermoplastic norbornene-based resin of the present invention, the temperature should typically be Tg±30° C., and preferably Tg±15° C., and even more preferably within a range from Tg−5° C. through to Tg+15° C. By maintaining the stretching process temperature within this range, irregularities in retardation can be suppressed, and the index ellipsoid can be controlled more easily.

There are no particular restrictions on the stretching magnification, with this figure typically being determined by the specific product characteristics desired, although typical magnification values should be from 1.01 to 10 fold, and preferably from 1.03 to 5 fold, and even more preferably from 1.03 to 3 fold. If the stretching magnification exceeds 10 fold, then controlling the retardation may become difficult.

The stretched film may simply be cooled, as is, although the film should preferably be heat set by holding the film in an atmosphere at a temperature between Tg−20° C. and Tg for at least 10 seconds, and preferably for 30 seconds to 60 minutes, and even more preferably for 1 to 60 minutes. By so doing, variations in the transmitted light retardation over time can be suppressed, enabling a stable retardation film to be produced.

The dimensional contraction coefficient on heating, of an optical film of the present invention which has not been subjected to stretching, in the case of heating for 500 hours at 100° C., is typically no more than 5%, and preferably no more than 3%, and even more preferably no more than 1%, and most preferably no more than 0.5%.

The dimensional contraction coefficient on heating, of a retardation film of the present invention, in the case of heating for 500 hours at 100° C., is typically no more than 10%, and preferably no more than 5%, and even more preferably no more than 3%, and most preferably no more than 1%.

A dimensional contraction coefficient within the above range can be achieved by a variety of techniques including appropriate selection of the specified monomers within the present invention, or appropriate selection of other copolymerizable monomers, as well as adjustment of the conditions for the casting method or the stretching method.

In a stretched film produced in the manner described above, the molecules are aligned as a result of the stretching, and a retardation is imparted to transmitted light, although this retardation can be controlled by factors such as the stretching magnification, the stretching temperature and the thickness of the film. For example, for films of the same thickness prior to stretching, those films with larger stretching magnification display a tendency to produce larger absolute values for the retardation of transmitted light, and consequently by varying the stretching magnification, a retardation film can be produced which imparts a desired level of retardation to the transmitted light. In contrast, for films subjected to the same stretching magnification, those films which displayed a greater thickness prior to stretching have a tendency to produce larger absolute values for the retardation of transmitted light, and consequently by varying the film thickness prior to stretching, a retardation film can be produced which imparts a desired level of retardation to the transmitted light. Within the stretching process temperature range described above, lower stretching temperature values have a tendency to produce larger absolute values for the retardation of transmitted light, and consequently by varying the stretching temperature, a retardation film can be produced which imparts a desired level of retardation to the transmitted light.

The value of the retardation imparted to transmitted light by a stretched retardation film produced in the above manner can be determined in line with the intended use of the film, and as such there are no particular restrictions, although in those cases in which the film is for use within a liquid crystal display element, an electroluminescence display element or a wavelength plate of a laser optics system, the retardation value is typically from 1 to 10,000 nm, and preferably from 10 to 2000 nm, and even more preferably from 15 to 1000 nm.

The retardation of light which has passed through a retardation film should preferably display a high level of uniformity, and at a wavelength of 550 nm, the variation in the retardation should typically be no more than ±20%, and preferably no more than ±10%, and even more preferably no more than ±5%. If the variation in the retardation exceeds ±20%, then use of the film within a liquid crystal display element or the like would result in color irregularities and the like, producing a deterioration in the overall performance of the display.

When the ratio between the retardation Re(550) at a wavelength of 550 nm and the retardation Re(400) at a wavelength of 400 nm, namely the ratio Re(400)/Re(550), falls within a range from 1.0 to 0.5, and preferably from 0.8 to 0.6, and even more preferably from 0.75 to 0.65, and in addition, the ratio between the aforementioned retardation Re(550) and the retardation Re(800) at a wavelength of 800 nm, namely the ratio Re(800)/Re(550), falls within a range from 1.5 to 1.0, and preferably from 1.5 to 1.3, and even more preferably from 1.5 to 1.4, then if the retardation at an arbitrary wavelength λ is termed Re(λ), the value of Re(λ)/λ can be made essentially constant across the entire wavelength region from 400 to 800 nm. If the value of Re(λ)/λ is controlled within ±20%, and preferably within ±10%, and even more preferably ±5% across the entire wavelength region from 400 to 800 nm, then a wide band λ plate with a retardation of, for example, ¼λ or ½λ across the entire specified wavelength region can be obtained. In other words, in the case in which the aforementioned Re(λ)/λ value is within a range from 0.20 to 0.30, and preferably from 0.22 to 0.28, and even more preferably from 0.24 to 0.26 across the entire wavelength region from 400 to 800 nm, then the retardation film will function as a ¼λ plate which interconverts circularly polarized light and linearly polarized light across the entire specified wavelength region. Similarly, in the case in which the aforementioned $Re(\lambda)/\lambda$ value is within a range from 0.40 to 0.60, and preferably from 0.45 to 0.55, and even more preferably from 0.48 to 0.52, then the retardation film will function as a $\frac{1}{2}\lambda$ plate which rotates the plane of polarization of linearly polarized light by 90°, across the entire wavelength region from 400 to 800 nm.

A retardation film of the present invention can be used as is, or bonded to a transparent substrate and used as a retardation plate. This retardation plate could also be laminated to other films, sheets or substrates. In the case of lamination, adhesives including pressure-sensitive adhesives can be used. Highly transparent adhesives are preferred, and specific examples include natural rubber, synthetic rubber, vinyl acetate/vinyl chloride copolymers, polyvinyl ether, acrylic-based resins and modified polyolefin-based resins, as well as curable pressure sensitive adhesives produced by adding a curing agent such as an isocyanate compound to the above adhesives, dry lamination adhesives produced by mixing a polyurethane based resin solution and an polyisocyanate-based resin resin solution, synthetic rubber based adhesives and epoxy-based resin adhesives.

In order to improve the efficiency of lamination onto another film sheet or substrate, the aforementioned retardation film and the retardation plate can also be laminated, in advance, with an adhesive layer. In such cases, any of the adhesives described above can be used.

<Optical Films with a Transparent Conductive Layer>

In an optical film of the present invention, a transparent conductive layer may be laminated to at least one surface of the optical film. Examples of suitable materials for forming such a transparent conductive layer include metals such as Sn, In, Ti, Pb, Au, Pt and Ag, as well as oxides of these metals, and either a simple metal film is formed on the surface of the substrate, or where necessary, the metal film may be subsequently oxidized. Although an oxide layer can be adhered, a film can first be formed from a simple metal or a low level oxide, and this film then converted to a transparent film by oxidation using either thermal oxidation, anodic oxidation or liquid phase oxidation. These transparent conductive layers may be formed by bonding another sheet or film comprising a transparent conductive layer to an optical film, or may be formed directly onto an optical film of the present invention using plasma polymerization methods, sputtering, vacuum deposition, plating, ion plating, spraying methods or electrolytic deposition. There are no particular restrictions on the thickness of the transparent conductive layer, which can be determined in accordance with the desired characteristics, although typically the thickness should be from 10 to 10,000 Angstroms, and preferably from 50 to 5000 Angstroms.

In those cases in which a transparent conductive layer is formed directly on an optical film of the present invention, an adhesive layer or an anchor coat layer may be provided between the film and the transparent conductive layer where necessary. Examples of suitable adhesives include heat resistant resins such as epoxy resins, polyimides, polybutadiene, phenol resins and polyether ether ketones. The aforementioned anchor coat layers utilize materials incorporating so-called acrylic prepolymers such as epoxy diacrylate, urethane diacrylate and polyester diacrylate. Curing can be conducted using known curing techniques such as UV curing or thermosetting.

An optical film with a transparent conductive layer of the present invention can be formed into a laminated product in combination with a polarizing film. There are no particular restrictions on the method used for combining the optical film with a transparent conductive layer of the present invention and the polarizing film, and one suitable method involves laminating the optical film with a transparent conductive layer to at least one surface of a polarizing film produced by laminating a protective film to both sides of a polarizing membrane, via a suitable adhesive applied to the opposite side of the optical film from the transparent conductive layer. Alternatively, the optical film with a transparent conductive layer of the present invention could also be used instead of employing the above polarizing membrane protective films, with the optical film being bonded directly to the polarizing membrane, via a suitable adhesive applied to the opposite side of the optical film from the transparent conductive layer. An optical film of the present invention with no transparent conductive layer may also be used as a protective film for a polarizing film. In such a case, if a retardation imparting film of the present invention is used as the protective film, then the protective film will function as a retardation film, and consequently there is no need to bond a separate retardation film to the polarizing film.

Where necessary, a gas barrier material such as polyvinylidine chloride or polyvinyl alcohol may also be laminated to at least one surface of an optical film with a transparent conductive layer according to the present invention, in order to lower the transmittance of oxygen and water vapor. In addition, a hard coat layer may then be laminated on top of the gas barrier layer in order to improve the scratch resistance and heat resistance of the film. Examples of suitable hard coat materials include organic hard coat materials such as organic silicon-based resin resins, melamine resins, epoxy resins and acrylic resins, as well as inorganic hard coat materials such as silicon dioxide. Of these materials, organic silicon-based resin resins and acrylic resins are preferred. The organic silicon-based resin resins include resins with all manner of functional groups, although resins with epoxy groups are preferred.

<Optical Films with an Antireflective Layer>

In an optical film of the present invention, an antireflective layer may be laminated to at least one surface of the optical film. An example of a method of forming the antireflective layer involves coating the optical film with a solution of a composition comprising a fluorine-based resin copolymer using a bar coater or a gravure coater or the like. The thickness of the antireflective layer is typically from 0.01 to 50 µm, and preferably from 0.1 to 30 µm, and even more preferably from 0.5 to 20 µm. If the thickness is less than 0.01 µm, then the desired antireflective effect is not achieved, whereas if the thickness exceeds 50 µm, then the likelihood of irregularities in the thickness of the applied film increases, causing a deterioration in the external appearance.

A known hard coat layer or a dirt prevention layer may also be laminated to an optical film with an antireflective layer according to the present invention. An aforementioned transparent conductive layer may also be laminated if required. In addition, the optical film may possess a function for imparting retardation to transmitted light, or a light diffusing function.

By providing the film with a plurality of functions, as described above, an optical film with an antireflective layer according to the present invention can enable a reduction to be made in the number of components of a film, so that for example, when such an optical film is used within a liquid crystal display element, the antireflective film may combine a number of functions including that of a retardation film, a light diffusing film, a polarizing plate protective film or an electrode substrate (transparent conductive layer).

As follows is a more detailed description of the present invention using a series of examples. However, provided the gist of the invention is retained, the present invention is in no way limited to the examples presented below. In the description below, unless otherwise specified the units "parts" and "%" refer to "parts by weight" and "% by weight" respectively.

First is a description of the various measurement methods disclosed below.

[Glass Transition Temperature (Tg)]

Using a differential scanning calorimeter (DSC) manufactured by Seiko Instruments Inc., the glass transition temperature was measured under a nitrogen atmosphere, with a rate of temperature increase of 20° C./min.

[Saturated Water Absorption]

Saturated water absorption values were measured in accordance with ASTM D570, and were determined by immersing a sample in 23° C. water for 1 week, and measuring the increase in weight.

[Residual Solvent Quantity]

A sample was dissolved in methylene chloride, and the thus obtained solution was analyzed using a gas chromatography apparatus GC-7A manufactured by Shimadzu Corporation.

[Total Light Transmittance, Haze]

These values were measured using a haze meter HGM-2DP manufactured by Suga Test Instruments Co., Ltd.

[Birefringence, Transmitted Light Retardation]

The birefringence and the retardation of transmitted light were measured using a KOBRA-21ADH and a KOBRA-CCD, both manufactured by Oji Scientific Instruments Co., Ltd. A total of 10 measurements at different locations were conducted for each sample, and the averages of those 10 values were reported as the birefringence and the retardation for that sample. The variation in the retardation was calculated using the formula below.

Re(m)/Re(A)×100(%)

Re(m): the larger value of: the absolute value of the difference between the maximum retardation value and the average value, and the absolute value of the difference between the minimum retardation value and the average value Re(A):the average retardation value

MONOMER SYNTHETIC EXAMPLES (1) Synthesis of 5-(4-biphenylcarbonyloxy)bicyclo[2.2.1]hept-2-ene

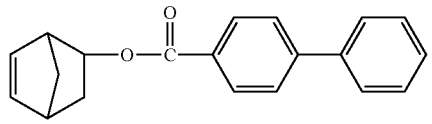

28 g (253.9 m mol) of norbornene alcohol (with an endo form/exo form molar ratio of 8/1) was measured into a 500 mL flask equipped with a dropping funnel, and the air inside the system was replaced with nitrogen. 41 mL (507.8 m mol) of pyridine was then added dropwise and stirred well until dissolved. Subsequently, with the temperature of the reaction system maintained at 4±2° C. by cooling in an ice bath, a solution of 50 g (230.8 m mol) of 4-phenylbenzoyl chloride dissolved in 200 mL of dry THF (tetrahydrofuran) was gradually dropped into the reaction solution with constant stirring, and following completion of the addition, stirring was continued for 1 hour with the reaction vessel still in the ice bath, and then for 1 hour at room temperature, and then for a further 30 minutes under reflux. Following cooling of the reaction mixture to room temperature, the generated pyridine salt was removed by filtration through filter paper, and the reaction mixture was well washed with distilled water. The solvent was then removed by heating under reduced pressure, and the product crystals were repeatedly recrystallized from n-hexane to yield 63 g of white crystals of 5-(4-biphenylcarbonyloxy)bicyclo[2.2.1] hept-2-ene (monomer). Analysis of the product crystals by HPLC revealed a purity of 98%.

(2) Synthesis of 5-(2-naphthylcarbonyloxy)bicyclo[2.2.1]hept-2-ene

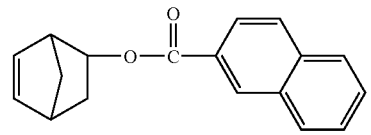

With the exceptions of using 44 g (230.8 m mol) of 2-naphthoyl chloride instead of 4-phenylbenzoyl chloride, and purifying the reaction product by column chromatography (packing: $Al_2O_3$, developing solvent: hexane), reaction was conducted in a similar manner to the example (1) above, and yielded 46 g of a white solid of 5-(2-naphthylcarbonyloxy)bicyclo[2.2.1]hept-2-ene. Analysis of the product monomer by HPLC revealed a purity of 99%.

Synthetic Example 1

100 parts of 8-methyl-8-methoxycarbonyltetracyclo [$4.4.0.1^{2,5}.1^{7,10}$]-3-dodecene (the specified monomer B), 150 parts of 5-(4-biphenylcarbonyloxy)bicyclo[2.2.1]hept-2-ene (the specified monomer A), 18 parts of 1-hexene (a molecular weight regulating agent) and 750 parts of toluene were combined in a reaction vessel under a nitrogen atmosphere, and the solution was then heated to 60° C. To this solution in the reaction vessel were then added 0.62 parts of a toluene solution of triethyl aluminum (1.5 mol/l) as a polymerization catalyst and 3.7 parts of a toluene solution (with a concentration of 0.05 mol/l) of tungsten hexachloride modified with t-butanol and methanol (t-butanol:methanol:tungsten=0.35 mol:0.3 mol:1 mol), and the system was subsequently stirred for 3 hours at 80° C. to enable the ring opening polymerization reaction to proceed, and yielded a solution of a ring opening polymer. The polymerization conversion rate in the polymerization reaction was 97%, and the intrinsic viscosity ($\eta_{inh}$) of the ring opening polymer, measured in chloroform at 30° C., was 0.65 dl/g.

4000 parts of the thus obtained ring opening polymer solution was placed in an autoclave, 0.48 parts of RuHCl (CO)[P($C_6H_5$)$_3$]$_3$ was added to the solution, and the resulting mixture was then stirred for 3 hours with heating, under a hydrogen gas pressure of 100 kg/cm² and at a reaction temperature of 165° C. to complete the hydrogenation reaction.

The thus obtained reaction product solution (hydrogenated polymer solution) was cooled, and the excess hydrogen gas was expelled. The reaction solution was then poured into a large quantity of methanol, the precipitate was separated and recovered, and this precipitate was dried to yield a hydrogenated polymer (a specified cyclic polyolefin-based resin).

The hydrogenation ratio of olefin-based resin unsaturated bonds within the hydrogenated polymer produced in this manner (hereafter referred to as resin (a-1)) was measured using 400 MHz $^1$H-NMR and revealed a ratio of 99.9%. Furthermore, the aromatic rings derived from the specified monomer A were essentially unhydrogenated.

Measurement of the Tg value of the resin (a-1) revealed a value of 110° C. Furthermore, measurement of the polystyrene equivalent number average molecular weight (Mn) and the weight average molecular weight (Mw) of the resin (a-1) using GPC methods (solvent: tetrahydrofuran) revealed a number average molecular weight (Mn) of 39,000 and a weight average molecular weight (Mw) of 126,000, giving a molecular weight distribution (Mw/Mn) of 3.23. Measurement of the saturated water absorption of the resin (a-1) at 23° C. yielded a value of 0.2%. In addition, measurement of the SP value produced a result of 17 (MPa$^{1/2}$). Measurement of the intrinsic viscosity ($\eta_{inh}$) of the resin (a-1) in chloroform at 30° C. produced a value of 0.67 dl/g.

Synthetic Example 2

With the exception of using 100 parts of 8-methyl-8-methoxycarbonyltetracyclo[4.4.0.1$^{2,5}$.1$^{7,10}$]-3-dodecene (the specified monomer B) and 150 parts of 5-(2-naphthyl-carbonyloxy)bicyclo[2.2.1]hept-2-ene (the specified monomer A), reaction was conducted in a similar manner to the synthetic example 1 and yielded a resin (b-1) with a hydrogenation ratio of the olefin-based resin unsaturated bonds of 99.9%, and essentially no hydrogenation of the aromatic rings derived from the specified monomer A. The value of Tg for the resin was 105° C. Measurement of the polystyrene equivalent number average molecular weight (Mn) and the weight average molecular weight (Mw) using GPC methods (solvent: tetrahydrofuran) revealed a number average molecular weight (Mn) of 33,000 and a weight average molecular weight (Mw) of 120,000, giving a molecular weight distribution (Mw/Mn) of 3.64. Furthermore, measurement of the saturated water absorption of the resin (b-1) at 23° C. yielded a value of 0.2%, and measurement of the intrinsic viscosity ($\eta_{inh}$) produced a value of 0.61 dl/g.

Comparative Synthetic Example 1

With the exception of using 250 parts of 5-(4-biphenyl-carbonyloxy)bicyclo[2.2.1]hept-2-ene (the specified monomer A) as the only monomer, reaction was conducted in a similar manner to the synthetic example 1 and yielded a resin (c-1) with a hydrogenation ratio of the olefin-based resin unsaturated bonds of 99.9%, and essentially no hydrogenation of the aromatic rings derived from the specified monomer A. The value of Tg for the resin was 100° C. Furthermore, measurement of the polystyrene equivalent number average molecular weight (Mn) and the weight average molecular weight (Mw) using GPC methods (solvent: tetrahydrofuran) revealed a number average molecular weight (Mn) of 36,000 and a weight average molecular weight (Mw) of 142,000, giving a molecular weight distribution (Mw/Mn) of 3.94.

Comparative Synthetic Example 2

With the exception of using 250 parts of 8-methyl-8-methoxycarbonyltetracyclo[4.4.0.1$^{2,5}$.1$^{7,10}$]-3-dodecene (the specified monomer B) as the only monomer, reaction was conducted in a similar manner to the synthetic example 1 and yielded a resin (d-1) with a hydrogenation ratio of the olefin-based resin unsaturated bonds of 99.9%. The value of Tg for the resin was 170° C. Furthermore, measurement of the polystyrene equivalent number average molecular weight (Mn) and the weight average molecular weight (Mw) using GPC methods (solvent: tetrahydrofuran) revealed a number average molecular weight (Mn) of 38,000 and a weight average molecular weight (Mw) of 122,000, giving a molecular weight distribution (Mw/Mn) of 3.21.

Comparative Synthetic Example 3

With the exception of using 250 parts of 5-(2-naphthyl-carbonyloxy)bicyclo[2.2.1]hept-2-ene (the specified monomer A) as the only monomer, reaction was conducted in a similar manner to the synthetic example 1 and yielded a resin (e-1) with a hydrogenation ratio of the olefin-based resin unsaturated bonds of 99.9%, and essentially no hydrogenation of the aromatic rings derived from the specified monomer A. The value of Tg for the resin was 85° C. Furthermore, measurement of the polystyrene equivalent number average molecular weight (Mn) and the weight average molecular weight (Mw) using GPC methods (solvent: tetrahydrofuran) revealed a number average molecular weight (Mn) of 40,000 and a weight average molecular weight (Mw) of 158,000, giving a molecular weight distribution (Mw/Mn) of 3.95.

Example 1

Comparative Example 1

The aforementioned resin (a-1) was dissolved in toluene to produce a concentration of 30% (the viscosity of the solution at room temperature was 30,000 mPa·s), and an INVEX lab coater manufactured by Inoue Metalworking Industry Co., Ltd. was then used to apply the solution to a PET film (Lumirror U94 manufactured by Toray Industries. Inc.) of thickness 100 μm which had been subjected to hydrophilic surface treatment with an acrylic acid-based resin system (to improve the adhesion), in sufficient quantity to produce a film, on drying, with a thickness of 100 μm. The film was then subjected to preliminary drying at 50° C., and then secondary drying at 90° C. The resin film was then peeled away from the PET film to yield a resin film (a-2). The residual solvent content of the thus obtained film was 0.5%.

The film was heated to a temperature of Tg±5° C., namely 115° C., in a tenter, and then stretched 2.5 fold at a stretching speed of 1000%/min. The stretched film was then held for approximately one minute while being cooled in a 110° C. atmosphere, namely Tg, and was then further cooled to room temperature before being removed, yielding a retardation film (a-3).

The resins (b-1), (c-1), (d-1) and (e-1) were converted into films in the same manner as described above, yielding films (b-2), (c-2), (d-2) and (e-2), and each of these films was then stretched under the same temperature conditions (the Tg value of each resin+5° C.) and the same stretching conditions to yield retardation films (b-3), (c-3), (d-3) and (e-3) respectively.

With the exception of using a heating temperature of Tg+10° C., a stretching speed of 400%/minute and a stretching magnification of 1.3 fold, samples of the films (c-2) and (d-2) were also stretched in the same manner as described above to yield retardation films (c-3') and (d-3') respectively.

The total light transmittance, the haze and the transmitted light retardation for each of these films (a-2), (a-3), (b-2), (b-3), (c-2), (c-3), (c-3'), (d-2), (d-3), (d-3'), (e-2), and (e-3) were measured. The results are shown in Table 1 and Table 2.

The birefringence (the value of Nx–Ny) for the films (c-3), (d-3) and (e-3) obtained under the same stretching conditions are shown in Table 3.

The retardation wavelength dependency, referenced against the retardation stretched films (a-3), (b-3), (c-3), (d-3) and (e-3). In other words, the retardation Re(λ) of transmitted light within a wavelength range from 400 to 800 nm was measured, and the values of Re(λ)/Re(550) were plotted in FIG. 1.

The retardation wavelength dependency of transmitted light within a wavelength range from 400 to 800 nm was also measured for each of the stretched films (a-3), (b-3), (c-3') and (d-3'). In other words, the retardation Re(λ) of transmitted light of wavelength λ was measured, and the values of Re(λ)/λ were plotted in FIG. 2.

TABLE 1

|  | Example 1 | | Comparative example 1 | | |
| --- | --- | --- | --- | --- | --- |
| Film type | a-2 | b-2 | c-2 | d-2 | e-2 |
| Total light transmittance: % | 93 | 93 | 93 | 93 | 93 |
| Haze: % | 0.1 | 0.1 | 0.1 | 0.1 | 0.1 |
| Retardation of transmitted light: nm | | | | | |
| 400 nm | less than 5 | less than 5 | less than 5 | less than 5 | less than 5 |
| 550 nm | less than 5 | less than 5 | less than 5 | less than 5 | less than 5 |
| 800 nm | less than 5 | less than 5 | less than 5 | less than 5 | less than 5 |

*) "Retardation of transmitted light" values are absolute values at the wavelengths shown in the table.

TABLE 3

| Film type | c-3 | d-3 | e-3 |
| --- | --- | --- | --- |
| Birefringence: Nx - Ny | | | |
| 400 nm | −0.0039 | 0.0083 | −0.0037 |
| 550 nm | −0.0027 | 0.0082 | −0.0028 |
| 800 nm | −0.0021 | 0.0081 | −0.0019 |

*) "Birefringence" values were measured at the wavelengths shown in the table.

As is evident from FIG. 1, the retardation films of the present invention formed from a resin obtained by polymerizing a monomer mixture comprising a specified monomer A displayed a positive wavelength dependency, whereas the retardation films formed from a resin obtained by either polymerizing solely a specified monomer A, or polymerizing a mixture containing no specified monomer A did not display a positive wavelength dependency.

Figure 2:
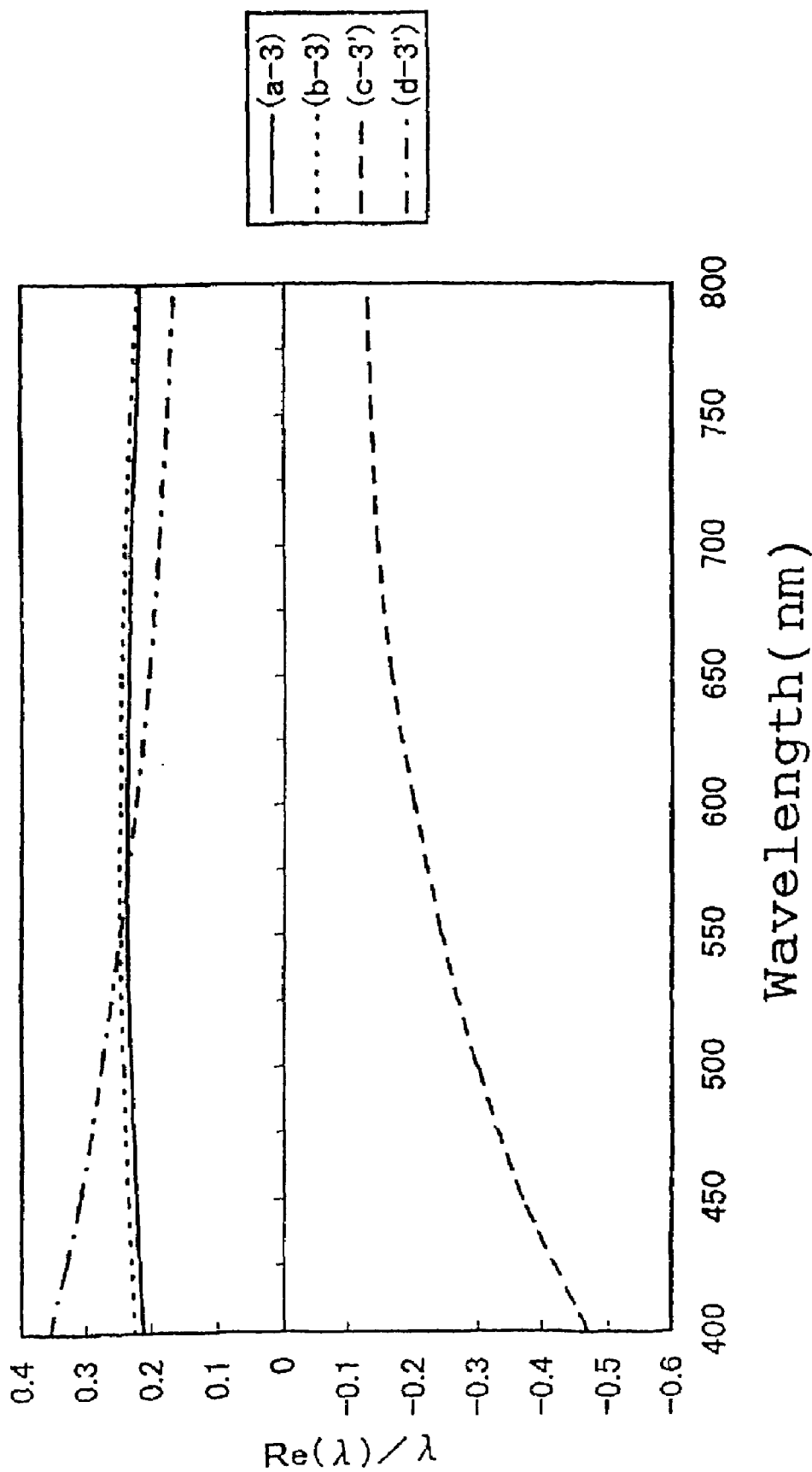
FIG. 2 is a graph showing the wavelength dependency of the retardation imparted to transmitted light by the retardation films (a-3) and (b-3) obtained in the example 1, and the retardation films (c-3') and (d-3') obtained in the comparative example 1, in other words, the relationship Re(λ)/λ between the wavelength λ of the transmitted light within the wavelength range from 400 to 800 nm, and the retardation Re(λ) of transmitted light at that wavelength λ.

As is evident from FIG. 2, the retardation films of the present invention formed from a resin obtained by polymerizing a monomer mixture comprising a specified monomer A displayed a substantially uniform value of Re(λ)/λ (0.215 to 0.247) within the wavelength region from 400 to 800 nm, and displayed the potential to function as a ¼λ plate across the entire aforementioned wavelength region, whereas the retardation films formed from a resin obtained by polymerizing either solely a specified monomer A, or a mixture containing no specified monomer A, may display an absolute value of approximately 0.25 at a wavelength of 550 nm, but the value of Re(λ)/λ diverges markedly from 0.25 as the wavelength shifts away from 550 nm, and as a result these retardation films only have the potential to function as a ¼λ plate within one portion of the aforementioned wavelength region.

From the data in the Table 3 shown above, it is evident that the retardation film (a-3) obtained by stretching, under the conditions described above, a film produced from the copolymer (a-1) according to the aforementioned synthetic example 1, and the retardation film (b-3) obtained by stretching, under the conditions described above, a film produced

TABLE 2

|  | Example 1 | | Comparative example 1 | | | | |
| --- | --- | --- | --- | --- | --- | --- | --- |
| Film type | a-3 | b-3 | c-3 | d-3 | e-3 | c-3' | d-3' |
| Total light transmittance: % | 93 | 93 | 93 | 93 | 93 | 93 | 93 |
| Haze: % | 0.1 | 0.1 | 0.1 | 0.1 | 0.1 | 0.1 | 0.1 |
| Retardation variation: % | less than 5 | less than 5 | less than 5 | less than 5 | less than 5 | less than 5 | less than 5 |
| Retardation of transmitted light: nm | | | | | | | |
| 400 nm | 85 | 90 | −331 | 704 | −319 | −188 | 143 |
| 550 nm | 130 | 136 | −231 | 693 | −235 | −134 | 136 |
| 800 nm | 172 | 176 | −182 | 686 | −164 | −102 | 132 |
| Re(λ)/λ | | | | | | | |
| 400 nm | 0.213 | 0.225 | −0.828 | 1.760 | −0.798 | −0.470 | 0.357 |
| 550 nm | 0.236 | 0.247 | −0.420 | 1.260 | −0.427 | −0.244 | 0.247 |
| 800 nm | 0.215 | 0.220 | −0.228 | 0.858 | −0.205 | −0.128 | 0.165 |

*) "Retardation variation" values were measured at a wavelength of 550 nm "Retardation of transmitted light" values were measured at the wavelengths shown in the table (not absolute values)

from the copolymer (b-1) according to the aforementioned synthetic example 2 satisfy the conditions of an optical film (1) according to the first aspect of the present invention, namely:

$$\Delta N_I(\lambda)+\Delta N_{II}(\lambda)>0, \text{ and}$$

$$\Delta N_I(\lambda)-\Delta N_I(800)<\Delta N_{II}(800)-\Delta N_{II}(\lambda)$$

In other words, in the case of the retardation film (a-3), then based on the $\Delta N_I(400)$ value, the $\Delta N_I(550)$ value and the $\Delta N_I(800)$ value for the retardation film (d-3) obtained by stretching, under the conditions described above, a film produced from a polymer (d-1) <corresponding with a structural unit (I) which imparts a positive birefringence> comprising only 8-methyl-8-methoxycarbonyltetracyclo [4.4.0.1$^{2,5}$.1$^{7,10}$]-3-dodecene (a specified monomer B), and for the retardation film (c-3) obtained by stretching, under the conditions described above, a film produced from a polymer (c-1) <corresponding with a structural unit (II) which imparts a negative birefringence>comprising only 5-(4-biphenylcarbonyloxy)bicyclo[2.2.1]hept-2-ene (a specified monomer A), the following can be confirmed.

$\Delta N_I(400): 0.0083+\Delta N_{II}(400): -0.0039>0$ $\Delta N_I(550): 0.0082+\Delta N_{II}(550): -0.0027>0$ $\Delta N_I(800): 0.0081+\Delta N_{II}(800): -0.0021>0$ $\Delta N_I(400): 0.0083-\Delta N_I(800): 0.0081 (=0.0002)<\Delta N_{II}(800): -0.0021-\Delta N_{II}(400): -0.0039 (=0.0018)$ $\Delta N_I(550): 0.0082-\Delta N_I(800): 0.0081 (=0.0001)<\Delta N_{II}(800): -0.0021-\Delta N_{II}(550): -0.0027 (=0.0006)$ Similarly, in the case of the retardation film (b-3), then based on the $\Delta N_I(400)$ value, the $\Delta N_I(550)$ value and the $\Delta N_I(800)$ value for the retardation film (d-3) described above, and for the retardation film (e-3) obtained by stretching, under the conditions described above, a film produced from a polymer (e-1) <corresponding with a structural unit (II) which imparts a negative birefringence> comprising only 5-(2-naphthylcarbonyloxy)bicyclo[2.2.1]hept-2-ene (a specified monomer A), the following can be confirmed.

$\Delta N_I(400): 0.0083+\Delta N_{II}(400): -0.0037>0$ $\Delta N_I(550): 0.0082+\Delta N_{II}(550): -0.0028>0$ $\Delta N_I(800): 0.0081+\Delta N_{II}(800): -0.0019>0$ $\Delta N_I(400): 0.0083-\Delta N_I(800): 0.0081 (=0.0002)<\Delta N_{II}(800): -0.0019-\Delta N_{II}(400): -0.0037 (=0.0018)$ $\Delta N_I(550): 0.0082-\Delta N_{II}(800): 0.0081 (=0.0001)<\Delta N_{II}(800): -0.0019-\Delta N_{II}(550): -0.0028 (=0.0009)$ Example 2

The film (a-2) was subjected to sand mat treatment, to produce an optical film (a-4) with a light diffusing function and with a haze value of 55% and a total light transmittance value of 93%. The film was exposed to an atmosphere of 80° C. and 90% relative humidity for 500 hours and the haze and the total transmittance were then re-measured, but neither value displayed any discernible change from the initial value.

The films (b-2) and (c-2) were also subjected to the same treatment to produce optical films (b-4) and (c-4) respectively with a light diffusing function and with haze values of 55% and total light transmittance values of 93%. The durability of the films (b-4) and (c-4) were evaluated in the same manner as the film (a-4), and both displayed no discernible changes from the initial values.

Example 3

A transparent conductive membrane was formed on one surface of the film (a-3), using a sputtering technique with a target of indium oxide/tin oxide (weight ratio of 95:5), and yielded a transparent conductive film (a-5). The total light transmittance of this transparent conductive film was very favorable and exceeded 85%, and a visual inspection of the external appearance of the film (the presence or absence of scratches, and the degree of warping of the film) also returned favorable results. The transparent conductive film was then exposed to an atmosphere of 80° C. and a relative humidity of 90% for a period of 500 hours, and the total light transmittance was re-measured and the external appearance of the film was visually inspected for evidence of changes. The results revealed that the total light transmittance remained very favorable and exceeded 85%, and the external appearance was also excellent, with no scratches, warping or swelling.

Example 4

A film of Opstar JN7212 manufactured by JSR Corporation was applied to one surface of the film (a-3), in sufficient quantity to produce a dried thin film of thickness 0.1 μm, thereby forming a film (a-6) with an antireflective layer. The film displayed excellent antireflective characteristics, with a reflectance of no more than 1%.

Example 5

To the surfaces of a polarizing membrane prepared by immersing a polyvinyl alcohol film of thickness 50 μm in a 40° C. bath containing 5 g of iodine, 250 g of potassium iodide, 10 g of boric acid and 1000 g of water, and then uniaxially stretching the film by a factor of 4 fold over a period of approximately 5 minutes, was applied an adhesive produced by combining 100 parts of an acrylic-based resin formed from 90% by weight of n-butyl acrylate, 7% by weight of ethyl acrylate and 3% by weight of acrylic acid, with 2 parts of a cross linking agent formed from a 75% by weight ethyl acetate solution of a trimethylolpropane (1 mol) addition product of tolylenediisocyanate (3 mols), and samples of the film (a-2) were subsequently laminated to both sides of the polarizing membrane to produce a polarizing film (a-7). This polarizing film was exposed to an atmosphere of 80° C. and a relative humidity of 90% for a period of 500 hours, and the external appearance of the film was then visually inspected for evidence of changes, but no abnormalities such as swelling or warping could be detected, and the degree of polarization was also maintained at a very favorable value exceeding 90%.

Example 6

With the exception of replacing the toluene used in the example 1 with a mixed solvent containing methylene chloride (good solvent) with a boiling point of 40° C. and an SP value of 19.2 (MPa$^{1/2}$) and methanol (poor solvent) with a boiling point of 65° C. and an SP value of 29.7 (MPa$^{1/2}$) in a ratio such that the methanol proportion within the mixed solvent was 10% by weight, a film of the resin (a-1) was prepared in the same manner as the example 1, yielding a film (a-8) with a light diffusing layer. The film displayed a haze value of 40% and a total light transmittance of 93%. The film was then exposed to an atmosphere of 80° C. and a relative humidity of 90% for a period of 500 hours, and the haze and the total light transmittance were re-measured, but neither value displayed any discernible change from the initial value.

Example 7

With the exception of adding 10 parts of an incompatible system of PMMA with a refractive index at room temperature of 1.492 (d line) per every 100 parts of the resin (a-1) with a refractive index at room temperature of 1.515 (d line), a resin film was prepared in the same manner as the example 1, and yielded a film (a-9). The average dispersed particle diameter of the PMMA within the film (measured by TEM) was 20 μm, the haze value was 20% and the total light transmittance was 92%. The film was then exposed to an atmosphere of 80° C. and a relative humidity of 90% for a period of 500 hours, and the haze and the total light transmittance were re-measured, but neither value displayed any discernible change from the initial value.

Example 8

With the exception of replacing the PET film used in the example 1 with a mat treated PET film with an irregular surface, a film of the resin (a-1) was prepared in the same manner as the example 1, yielding a film (a-10) with a light diffusing layer. The film displayed a haze value of 10% and a total light transmittance of 93%. The film was then exposed to an atmosphere of 80° C. and a relative humidity of 90% for a period of 500 hours, and the haze and the total light transmittance were re-measured, but neither value displayed any discernible change from the initial value.

INDUSTRIAL APPLICABILITY

An optical film of the present invention displays all of the advantages associated with conventional thermoplastic norbornene-based resin-based resin films including superior optical characteristics such as a high degree of transparency, a low birefringence, and uniform and stable retardation of transmitted light upon stretching and orientation, together with good levels of heat resistance and adhesion and bonding with other materials, and little deformation on water absorption, and in addition also possesses a positive wavelength dependency which has not been obtainable with conventional thermoplastic norbornene-based resin system films. Consequently, if an optical film of the present invention is used as a retardation film then a λ plate which displays a uniform retardation across the wavelength range from 400 to 800 nm can be produced with a single retardation film. The present invention is also useful as an optical film with either a light diffusing function, transparent conductivity, or an antireflective function. Accordingly, optical films of the present invention can be used as liquid crystal display elements in a wide variety of devices such as mobile telephones, personal digital assistants, pocket pagers, navigation systems, vehicle mounted liquid crystal displays, liquid crystal monitors, light modulation panels, office automation equipment displays and audio visual equipment displays, as well as electroluminescence displays or touch panels. This type of optical film can also be used as the wavelength plate within recording and/or playback devices for optical disks such as CD, CD-R, MD, magnetooptic and DVD disks.

What is claimed is:

1. An optical film comprising a thermoplastic norbornene-based resin formed of a copolymer comprising a structural unit a represented by a general formula (1) shown below, and a structural unit b represented by a general formula (2) shown below:

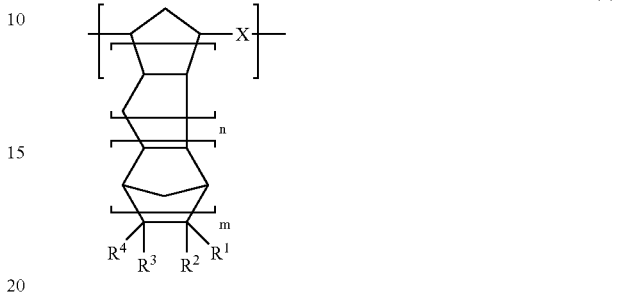

(1)

wherein, n represents either 0 or 1, and m represents either 0, or an integer of 1 or greater; X represents a group represented by a formula —CH=CH— or a group represented by a formula —CH$_2$CH$_2$—, $R^1$, $R^2$, $R^3$, and $R^4$ each represent, independently, a hydrogen atom; a halogen atom; a substituted or unsubstituted hydrocarbon group of 1 to 30 carbon atoms which may contain a linkage group incorporating an oxygen atom, a nitrogen atom, a sulfur atom or a silicon atom; or a polar group; or alternatively $R^1$ and $R^2$, or $R^3$ and $R^4$, or $R^2$ and $R^3$ may be mutually bonded together forming a hydrocarbon ring or a heterocyclic ring wherein said hydrocarbon ring or said heterocyclic ring may be aromatic or non-aromatic, and may be either a single ring structure, or form a polycyclic structure through condensation with another ring, and at least one of said groups $R^1$ to $R^4$ is, independently, a group represented by a general formula (1-1) shown below or a group represented by a general formula (1-2) shown below; and wherein a plurality of each of said groups X, $R^1$, $R^2$, $R^3$ and $R^4$ within said copolymer may be identical or different,

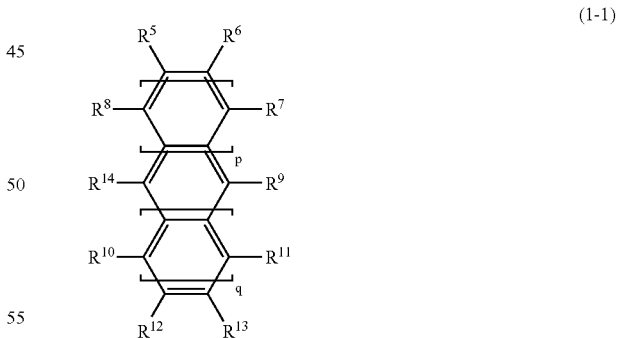

(1-1)

wherein, $R^5$ to $R^{14}$ each represent, independently, a hydrogen atom; a halogen atom; a substituted or unsubstituted monovalent hydrocarbon group of 1 to 30 carbon atoms which may contain a linkage group incorporating an oxygen atom, a nitrogen atom, a sulfur atom or a silicon atom; or a monovalent polar group, and one of said groups $R^5$ to $R^{14}$ is a group represented by a formula —C(O)O— in which a carbonyl group side is bonded to a carbon atom of a ring structure shown in said formula (1-1); p and q each represent, independently, an integer of 0 to 2, and in a case in which p=q=0, $R^6$ and $R^9$, or $R^{13}$ and $R^9$, or $R^5$ and $R^{14}$, or $R^{12}$ and $R^{14}$ may be mutually bonded together forming a hydrocarbon ring or a heterocyclic ring wherein said hydrocarbon ring or said heterocyclic ring may be either a single ring structure, or form a polycyclic structure through condensation with another ring; and a plurality of each of said groups $R^5$ to $R^{14}$ within said copolymer may be identical or different,

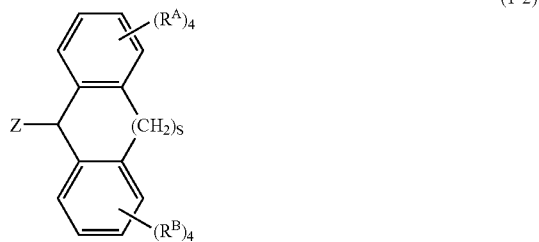
(1-2)

wherein, Z, $R^A$ and $R^B$ each represent, independently, a hydrogen atom; a halogen atom; a substituted or unsubstituted monovalent hydrocarbon group of 1 to 30 carbon atoms which may contain a linkage group incorporating an oxygen atom, a nitrogen atom, a sulfur atom or a silicon atom; or a monovalent polar group, and one of said groups $R^A$, $R^B$ and Z is a group represented by a formula —C(O)O— in which a carbonyl group side is bonded to a carbon atom of a ring structure shown in said formula (1-2); s represents 0 or an integer of 1 or greater; and a plurality of each of said groups Z, $R^A$ and $R^B$ within said copolymer may be identical or different,

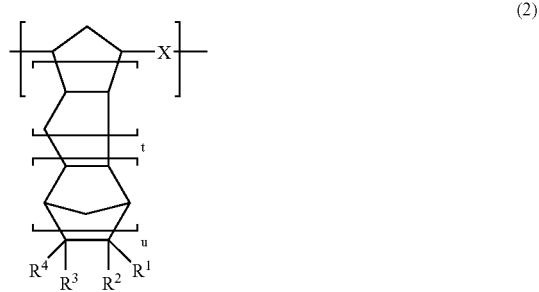
(2)

wherein, t represents 0 or 1, u represents 0 or an integer of 1 or greater; and X, $R^1$, $R^2$, $R^3$ and $R^4$ each have an identical meaning as defined in relation to said general formula (1), although cases in which said groups $R^1$ to $R^4$ a group represented by said general formula (1-1) or a group represented by said general formula (1-2) are excluded.

2. The optical film according to claim 1, comprising a structural unit a in which n=m=0 in said general formula (1), and a structural unit b in which t=0 and u=1 in said general formula (2).

3. The production process according to claim 2, wherein a mixed solvent of a good solvent and a poor solvent of said thermoplastic norbornene-based resin is used as said organic solvent.

4. A production process for an optical film according to claim 1, comprising a step of casting an organic solvent solution containing said thermoplastic norbornene-based resin.

5. The optical film according to claim 1, which imparts retardation to transmitted light.

6. The optical film according to claim 1, wherein a ratio of a retardation Re(550) at a wavelength of 550 nm and a retardation Re(400) at a wavelength of 400 nm, namely Re(400)/Re(550), is within a range from 1.0 to 0.5, and a ratio of said retardation Re(550) and a retardation Re(800) at a wavelength of 800 nm, namely Re(800)/Re(550), is within a range from 1.5 to 1.0.

7. The optical film according to claim 1, wherein a variation in a value represented by Re(λ)/λ [wherein λ represents a wavelength of transmitted light through said film, and Re(λ) represents a retardation at said wavelength λ] is within a range of ±20% from an average value across an entire wavelength range from 400 to 800 nm.

8. The optical film according to claim 1, with a light diffusing function on at least one surface thereof.

9. The optical film according to claim 1, with a transparent conductive layer on at least one surface thereof.

10. The optical film according to claim 1, with an anti-reflective layer on at least one surface thereof.

11. A polarizing plate protective film formed of an optical film according to claim 1.

12. A polarizing plate comprising an optical film according to claim 1.

13. The optical film according to claim 1, wherein the proportion of the structural unit a is from 95 to 5% by weight of said copolymer.

14. The optical film according to claim 1, wherein at least one of said groups $R^1$ and $R^4$ represents a polar group.

15. The optical film according to claim 1, wherein at least one of said groups $R^1$ and $R^4$ is a polar group represented by a general formula (5):

—$(CH_2)_z COOR^{15}$ wherein z is from 0 to 5, and $R^{15}$ is a monovalent organic group.

* * * * *